(12) United States Patent
Choi et al.

(10) Patent No.: US 9,494,821 B2
(45) Date of Patent: Nov. 15, 2016

(54) DISPLAY DEVICE HAVING POLARIZED LIGHT SOURCE

(76) Inventors: Uk Choi, Seoul (KR); Ju Won Kim, Seoul (KR)

(*) Notice: Subject to any disclaimer, the term of this patent is extended or adjusted under 35 U.S.C. 154(b) by 465 days.

(21) Appl. No.: 13/812,317

(22) PCT Filed: Jul. 26, 2011

(86) PCT No.: PCT/KR2011/005501
§ 371 (c)(1),
(2), (4) Date: Jan. 25, 2013

(87) PCT Pub. No.: WO2012/015220
PCT Pub. Date: Feb. 2, 2012

(65) Prior Publication Data
US 2013/0120962 A1    May 16, 2013

(30) Foreign Application Priority Data

Jul. 27, 2010  (KR) .................... 10-2010-0072201
Sep. 10, 2010  (KR) .................... 10-2010-0088893
Sep. 17, 2010  (KR) .................... 10-2010-0091423
Nov. 25, 2010  (KR) .................... 10-2010-0117956
Jan. 12, 2011  (KR) .................... 10-2011-0003062

(51) Int. Cl.
*G02B 27/28*  (2006.01)
*G02F 1/1335*  (2006.01)
*G09F 13/04*  (2006.01)
(Continued)

(52) U.S. Cl.
CPC .......... *G02F 1/1336* (2013.01); *G02B 27/286* (2013.01); *G02F 1/13362* (2013.01); *G02F 1/133528* (2013.01); *G09F 13/04* (2013.01); *G09F 13/30* (2013.01); *G09F 19/226* (2013.01); *G09F 19/22* (2013.01)

(58) Field of Classification Search
CPC .. G02B 27/286; G02B 26/06; G02B 27/281; G02F 1/13362; G02F 1/133528; G09F 19/22; G09F 13/30; G09F 13/00; G09F 13/02
See application file for complete search history.

(56) References Cited

U.S. PATENT DOCUMENTS 2,018,214 A * 10/1935 Land ............................. 40/548
2,165,974 A *  7/1939 Land ............................. 40/548
(Continued)

FOREIGN PATENT DOCUMENTS

CN        1224177 A    7/1999
CN      103328886 A    9/2013
(Continued)

OTHER PUBLICATIONS

European Search Report for European Patent Application No. 11812749.7, dated Dec. 20, 2013.
(Continued)

*Primary Examiner* — Ismael Negron
(74) *Attorney, Agent, or Firm* — Bachman & LaPointe, P.C.

(57) ABSTRACT

A display device includes a reflective base member, a first light polarizing film disposed on the surface of the base member, a light source, a second light polarizing medium receiving light from the light source and emitting polarized light towards the first light polarizing film, a birefringence medium positioned between the second light polarizing medium and the first light polarizing film, and means for changing the direction of polarization of the second light polarizing means.

8 Claims, 26 Drawing Sheets

(51) Int. Cl.
  *G09F 13/30* (2006.01)
  *G09F 19/22* (2006.01)

(56) References Cited

U.S. PATENT DOCUMENTS

| | | | | |
|---|---|---|---|---|
| 2,169,022 A | * | 8/1939 | Chubb | 40/548 |
| 2,313,831 A | * | 3/1943 | Martin | 40/548 |
| 2,393,969 A | * | 2/1946 | Burchell et al. | 40/548 |
| 2,473,857 A | * | 6/1949 | Burchell | 40/548 |
| 2,700,919 A | * | 2/1955 | Boone | 40/548 |
| 2,763,078 A | * | 9/1956 | Graves | 40/434 |
| 2,838,864 A | * | 6/1958 | Guida | 40/548 |
| 2,846,799 A | * | 8/1958 | Viszlocky et al. | 40/434 |
| 3,054,204 A | * | 9/1962 | Yates | 40/548 |
| 3,315,391 A | * | 4/1967 | Lane et al. | 40/548 |
| 4,088,400 A | * | 5/1978 | Assouline et al. | 353/20 |
| 5,138,474 A | | 8/1992 | Arakawa | |
| 6,204,901 B1 | | 3/2001 | Knox | |
| 9,016,884 B2 | | 4/2015 | Choi et al. | |
| 2006/0181771 A1 | | 8/2006 | Taira | |

FOREIGN PATENT DOCUMENTS

| | | |
|---|---|---|
| JP | 07333574 A | 12/1995 |
| JP | 10-069243 A | 3/1998 |
| JP | 2000105369 A | 4/2000 |
| JP | 2003075822 A | 3/2003 |
| JP | 2006039056 A | 2/2006 |
| KR | 20-1999-0021992 U | 6/1999 |
| KR | 20-0316449 Y1 | 6/2003 |
| KR | 20-0423280 Y1 | 8/2006 |
| KR | 10-2007-0039838 A | 4/2007 |

OTHER PUBLICATIONS

Chinese Office Action for Chinese Patent Application No. 201180037055.4, dated Oct. 24, 2014.
International Search Report and Written Opinion for PCT/KR2011/005501, dated Jan. 5, 2012.
Office action dated Oct. 12, 2012 in KR10-2011-0074013.

* cited by examiner (a)

(b)

DISPLAY DEVICE HAVING POLARIZED LIGHT SOURCE

BACKGROUND OF THE INVENTION

1. Technical Field

The present invention relates to a display device having polarized light source, and more particularly, to the display device having polarized light source which provides display by means of polarization of light that various changes of brightness and darkness or of colors happen at a polarization zone formed by light polarizing means.

2. Background

Polarization refers to the phenomenon that the direction of the electric field is constant in the plane perpendicular to a travel direction of light. The typical example of the polarization is that two polarizers eliminate the light if their transmission directions are placed at right angles.

By using this polarization, through a polarization film etc, the light can be polarized to the constant direction. Also, by transmitting the polarized light through a birefringence medium such as a birefringence film, the light can have different polarization directions according to the wavelengths.

The present invention provides a display device having polarized light source using the polarization phenomenon that presents unique display that various changes of brightness and darkness or of colors happen at a zone formed by light polarizing means to which the light is shined.

SUMMARY OF THE INVENTION

Technical Problem

The purpose of the present invention is to provide a display device having polarized light source which presents unique display by means of the polarization where various changes of brightness and darkness or of colors happen at a zone to which the light is shined.

In another aspect, the purpose of the present invention is to provide a display device having polarized light source which presents unique display where various changes of brightness and darkness or of colors happen at a zone to which the light is shined while the light from a light source does not cause any visual disturbance to people.

In another aspect, the purpose of the present invention is to provide a display device having polarized light source that provides a polarized light source emitting polarized light of a particular basic color and presents various colors and their changes at a polarization zone through the mix of the colored light therefrom.

In other aspect, the purpose of the present invention is to provide a display device having polarized light source presenting display effects that brightness and darkness or color variously changes at a zone to which light is shined in the inside of building, signboard, exterior building wall or glass window and so forth and may be used for ornamentation, advertisement or promotion or to add beauty to the building.

Technical Solution

The present invention provides a polarization display device comprising: a polarization zone comprising polarizing means for polarizing light; a polarization light source emitting light that is polarized and illuminated to the polarization zone; wherein, polarization direction of the polarized light emitted from the polarization light source and the polarization direction of the polarization zone change relative to each other.

According to the present invention, the polarization light source emits the light of which the polarization direction changes and the polarization zone is stationary.

According to the present invention, the polarizing means comprises a polarization film, a polarization plate or a polarizing glass.

According to the present invention, the polarization zone is plurally provided.

According to the present invention, the polarization directions of the adjoining polarization zones are different.

According to the present invention, the polarization directions of the adjoining polarization zones have sequential angular differences along the adjoining arrangement sequence.

According to the present invention, the polarization light source comprises a light source, means for polarization that polarizes the light of the light source and means for rotation that rotates the means for polarization whereby the light emitted from the light source is polarized as it passes through the means for polarization and its polarization direction rotates to make a change.

According to the present invention, the means for rotation rotates the means for polarization or the light source and the means for polarization at the same time.

According to the present invention, the polarization light source comprises a light source, means for polarization that polarizes the light emitted from the light source, a liquid crystal device to which the light that is polarized as it passes through the means for polarization is transmitted whereby the polarization direction of the polarized light that travels through the liquid crystal device changes according to voltage applied to the liquid crystal device.

The present invention also provides a polarization display device comprising: a polarization zone comprising polarizing means for polarizing light; a polarization light source emitting light that is polarized and illuminated to the polarization zone; a birefringence medium positioned between the polarization light source and the polarization zone; wherein, the polarization direction of the light emitted from the polarization light source, the birefringence medium and the polarization direction of the polarization zone rotate relative to one another.

According to the present invention, the polarization zone is plurally provided.

According to the present invention, the polarization directions of the adjoining polarization zones are different.

According to the present invention, the polarization directions of the adjoining polarization zones have sequential angular differences along the adjoining arrangement sequence.

According to the present invention, the rotation includes a partial rotation to an angle.

According to the present invention, the polarizing means comprises a polarization film, a polarization plate or a polarizing glass and the birefringence medium is a type of a film or a plate.

According to the present invention, the birefringence medium is the type of the film or the plate and attached to the polarization zone.

According to the present invention, the polarization direction of the light emitted from the polarization light source rotates and the birefringence medium and the polarization zone are stationery.

According to the present invention, the birefringence medium rotates and the polarization direction of the light emitted from the polarization light source and the polarization zone are stationery.

According to the present invention, the birefringence medium is attached to the polarization light source and rotates integrally with the polarization light source, and the polarization zone is stationery.

According to the present invention, the polarization light source comprises a light source, means for polarization that polarizes the light emitted from the light source and means for rotation that rotates the means for polarization whereby the light emitted from the light source is polarized as it passes through the means for polarization and its polarization direction rotates to make a change.

According to the present invention, the means for rotation rotates the means for polarization or the light source and the means for rotation at the same time.

According to the present invention, the polarization light source comprises a light source, means for polarization that polarizes the light emitted from the light source, a liquid crystal device to which the light that is polarized as it passes through the means for polarization is transmitted whereby the polarization direction of the polarized light that travels through the liquid crystal device changes according to voltage applied to the liquid crystal device.

According to the present invention, the birefringence medium is disposed in front of the liquid crystal device in the polarization light source.

The present invention further provides a polarization display device comprising: a birefringence zone comprising a birefringence medium that double refracts light that travels therethrough; a polarization light source emitting light that is polarized and illuminated to the birefringence zone and that its polarization direction changes; and a polarization zone comprising polarizing means for polarizing light, the polarization zone disposed behind the birefringence zone.

According to the present invention, the birefringence zone is plurally provided.

According to the present invention, the birefringence characteristics of the adjoining birefringence zones are different.

According to the present invention, the birefringence medium is a type of film or plate and the polarization zone comprises a polarization film, a polarization plate or a polarizing glass.

According to the present invention, the birefringence medium is the type of film or plate and is attached to the surface of the polarization zone.

According to the present invention, the plurality of the birefringence zones forms a particular shape.

According to the present invention, the polarization light source comprises a light source, means for polarization that polarizes the light of the polarization light source and means for rotation that rotates the means for polarization whereby the light emitted from the light source is polarized as it passes through the means for polarization and its polarization direction rotates to make a change.

According to the present invention, the means for rotation rotates the means for polarization or the light source and the means for polarization at the same time.

According to the present invention, the polarization light source comprises a light source, means for polarization that polarizes the light emitted from the light source, a liquid crystal device to which the light that is polarized as it passes through the means for polarization is transmitted whereby the polarization direction of the polarized light that travels through the liquid crystal device changes according to voltage applied to the liquid crystal device.

The present invention further provides a polarization display device comprising: a polarization zone comprising polarizing means for polarizing light; a polarization light source emitting light of a particular color that is polarized and illuminated to the polarization zone; wherein, polarization direction of the polarized light emitted from the polarization light source and the polarization direction of the polarization zone change relative to each other.

According to the present invention, the polarization light source emits the light of which the polarization direction changes and the polarization zone is stationary.

According to the present invention, the polarization zone is plurally provided.

According to the present invention, the polarization directions of the adjoining polarization zones are different.

According to the present invention, the polarization directions of the adjoining polarization zones have sequential angular differences along the adjoining arrangement sequence.

According to the present invention, the polarization zone comprises a polarization film, a polarization plate or a polarizing glass.

According to the present invention, the polarization light source is plurally provided.

According to the present invention, the three types of R (red light), G (green light) and B (blue light) of the polarization light sources are provided.

According to the present invention, the polarization light source comprises a light source emitting light of a particular color, means for polarization that polarizes the light of the light source and means for rotation that rotates the means for polarization whereby the light emitted from the light source is polarized as it passes through the means for polarization and its polarization direction rotates to make a change.

According to the present invention, the means for rotation rotates the means for polarization or the light source and the means for polarization at the same time.

According to the present invention, the polarization light source comprises a light source emitting a light of a particular color, means for polarization that polarizes the light emitted from the light source, a liquid crystal device to which the light that is polarized as it passes through the means for polarization is transmitted whereby the polarization direction of the polarized light that travels through the liquid crystal device changes according to voltage applied to the liquid crystal device.

Advantageous Effects

According to the present invention, it is possible to present unique display that various changes of brightness and darkness or color appear on a zone to which light is transmitted.

According to the present invention, it is possible to present display where various changes of brightness and darkness or of colors happen at a zone to which the light is shined while the light from a light source does not cause any visual disturbance to people.

According to the present invention, it is possible to present display where a polarized light source emitting polarized light of a particular basic color is provided and various colors and their changes at a polarization zone through the mix of the colored light therefrom are presented.

According to the present invention, it is possible to present display that a polarization zone or a birefringence zone disposed in the inside of building, signboard, exterior building wall or glass window and so forth forms a shape of brand, logo, picture or character so forth and the brightness and darkness of or the color of the shape variously changes.

The details of one or more embodiments of the invention are set forth in the accompanying drawings and the description below. Other features, objects, and advantages of the invention will be apparent from the description and drawings, and from the claims.

DETAILED DESCRIPTION

The embodiments of the present invention will be explained with reference to the accompanying drawings.

FIGS. 1 to 5 show a display device having polarized light source according to a first aspect of the present invention.

Figure 1:
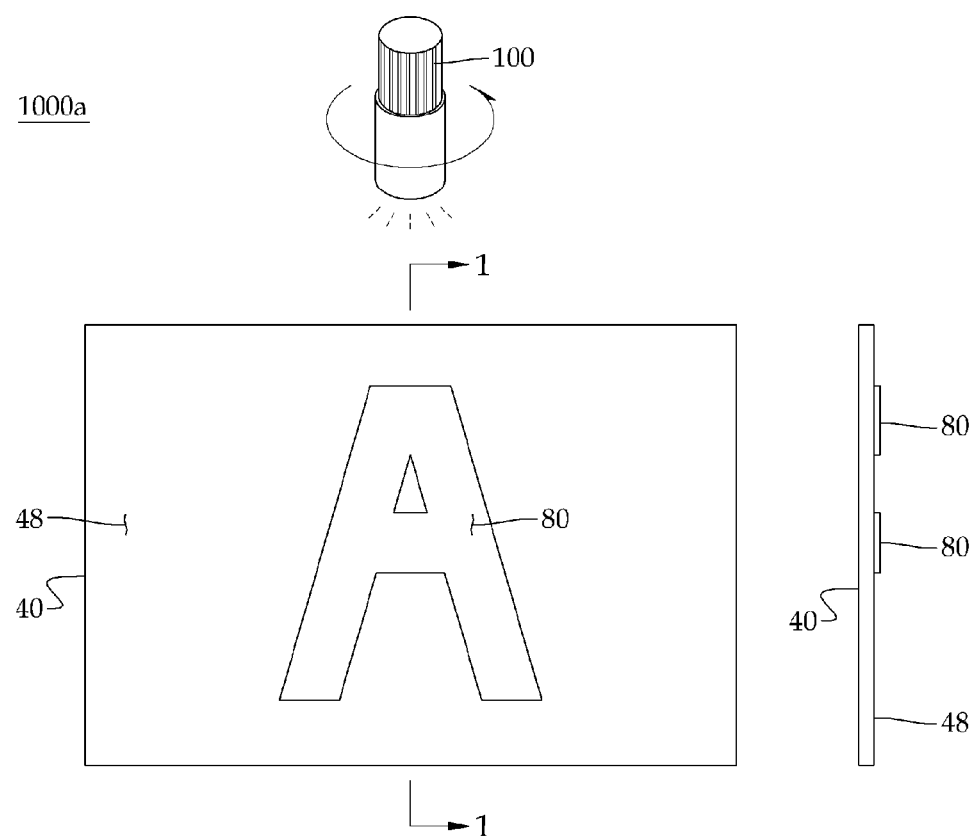
FIG. 1 shows a first embodiment of a display device having polarized light source according to a first aspect of the present invention.

FIG. 1 shows a first embodiment 1000a according to the first aspect of the display device having polarized light source according to the present invention.

According to the first aspect of the present invention, a polarization zone 80 is provided and the polarization zone 80 is formed by light polarizing means.

In the present embodiment, a base member 40 is provided and the polarization zone 80 is formed on the upper face 48 of the base member 40.

The polarization zone 80 is formed by light polarizing means such as a polarization film, a polarization plate or a polarization glass and it can polarizes the light.

With reference to the drawing, the polarization film or the polarization glass having the shape of letter A is attached to the upper face 48 of the base member 40 and it forms the polarization zone 80 having the shape of letter A.

As described as below, a plurality of the polarization zones may be provided and, if a plurality of polarization zones is provided, it is preferable that the polarization directions of the adjoining polarization zones are different.

According to the first aspect of the present invention, a polarized light source is provided and the polarized light source is to emit polarized light and shine the polarization zone.

Also, according to the first aspect of the present invention, the polarization direction of the polarized light emitted from the polarized light source and the polarization direction of the polarization zone change with respect to each other. As an example for this, in the embodiments of the polarized light source according to the first aspect of the present invention, the polarized light source 100 emitting the light that its polarization direction changes is provided and the polarization zone is stationary.

Figure 22:
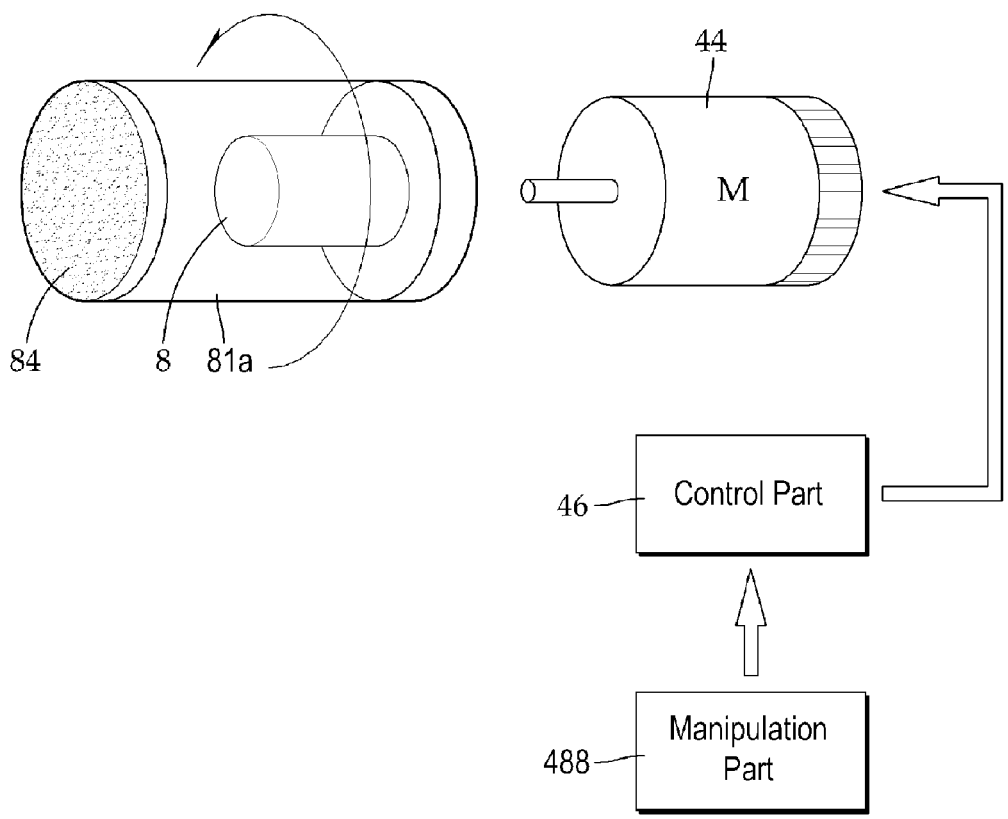
FIGS. 22 and 23 show a structure of a polarized light source emitting light polarization direction of which changes.
Figure 23:
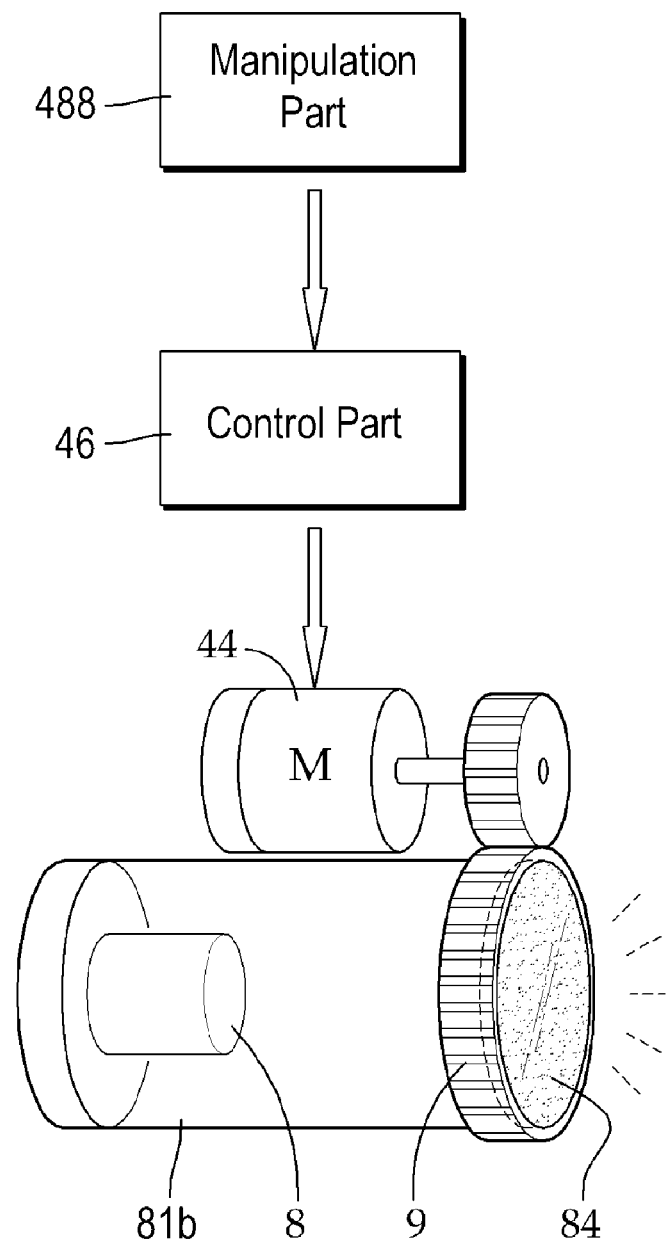

With reference to FIGS. 22 and 23, polarized light source 100a and 100b are examples showing the structure of the polarized light source 100. The polarized light source 100a and 100b emitting the polarized light where its polarization direction changes has a light source 8, light polarizing means 84 that polarizes the light from the light source 8 and a motor 44 that rotates the light polarizing means 84 as shown in FIGS. 22 and 23. The light from the light source 8 transmits through the light polarizing means 84 and is polarized and its polarization direction rotates to make a change.

The polarization polarized light source 100a in FIG. 22 has the light source 8 in a body part 81a. The light polarizing means 84 such as a polarizing filter is arranged in front of the light source 8 and the motor 44 rotates the body part 81a so that the light source 8 and the light polarizing means 84 are rotated together at the same time.

The polarized light source 100b in FIG. 23 has the light source 8 in the body part 81b. The light polarizing means 84 such as the polarizing filter is arranged in front of the light source 8. A gear 9 is equipped around the light polarizing means 84 and the motor 44 rotates the gear 9 so that light polarizing means 84 is rotated.

The polarization polarized light source 100a and 100b in FIGS. 22 and 23 has a manipulation part 488 to manipulate the rotation of the motor 44 and a control part 46 to control the rotation of the motor 44. Accordingly, the rotation range (rotation angle) of the polarization direction of the polarized light emitted from the light source 8 and its rotation speed and so forth can be adjusted.

The polarized light source 100a and 100b uses the motor power to change the polarization direction, however, it is not limited thereto and it is possible to use manual power.

Figure 25:
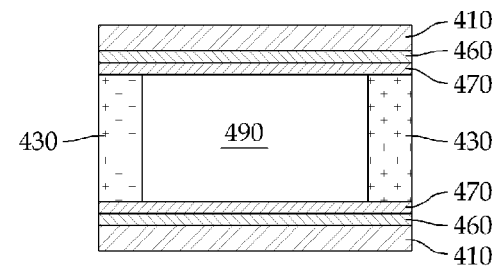
FIG. 25 shows a structure of a liquid crystal device.

The polarized light source 100a and 100b emitting the polarized light of which the polarization direction changes is provided by making use of a liquid crystal device 400 as shown in FIG. 25.

The liquid crystal device 400 making a change of the polarization direction secures space by interposing a spacer between opposite glass substrates 410 and 410, and liquid crystal 490 is filled in the space and the space is sealed by a sealant 430. On each of the lower part of the glass substrates 410 and 410, a transparent electrode 460 and a liquid crystal alignment layer 470 are sequentially laminated.

Figure 26:
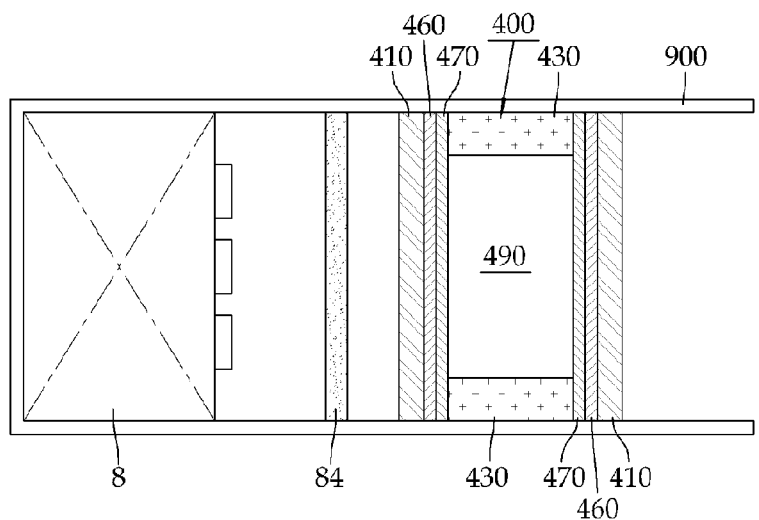
FIG. 26 shows a structure of a polarized light source emitting the polarized light of which the polarization direction changes by means of the liquid crystal device.

When voltage is applied to the transparent electrodes 460 and 460, the liquid crystal 490 changes its alignment and, if polarized light is transmitted to one side of the liquid crystal device 400 (for example, to the glass substrate 410 in the lower part), the light travels through the liquid crystal 490 (along the direction from bottom to top) and its polarization direction changes in proportional to the voltage applied to the liquid crystal, and then the light is emitted out from the other side (to the upper direction). Substantially, it is the structure that the polarizing plates are removed from a LCD panel. The polarized light source using the liquid crystal device 400 has an advantage that it can change the polarization direction spontaneously, FIG. 26 shows an example of the polarized light source 100c that uses the liquid crystal device 400 shown in FIG. 25.

The light source 8 is provided in a case member 900 and the light polarizing means 84 is arranged in front of the light source 8 and the liquid crystal device 400 is arranged in front of the light polarizing means 84.

The light emitted from the light source 8 is polarized as it travels through the light polarizing means 84 and, then, its polarization direction rotates as it passes through the liquid crystal device 400 and then it is emitted out.

In this case, it is preferable that the liquid crystal device 400 changes the polarization direction of the polarized light up to 90° or 180°, or beyond that according to the voltage applied to the liquid crystal.

The polarized light source 100 is arranged to emit the polarized toward the polarization zone 80.

The display device having polarized light source 1000a of the first embodiment according to the first aspect of the present invention operates as described below.

The polarized light source 100 emits the polarized light of which the polarization direction changes toward the polarization zone 80.

In this case, the light emitted from the polarized light source 100 where its polarization direction changes is transmitted to the polarization zone 80, however, the light cannot pass through the polarization zone 80 if the polarization direction of the light comes to the point where it is vertical to the polarization direction of the polarization zone 80.

If the light passes through wholly according to the change of the polarization direction, the polarization zone 80 becomes bright. But, if the light passes through partially or fails to pass through according to the change of the polarization direction, it becomes dark or black.

If the base member 40 has a color, it may be seen by the color of the base member 40 if the light passes through wholly, it may be seen by the dark color if the light passes through partially, and it may be seen by black if the light fails to pass through.

The above description is directed to the case that the light is reflected at the base member 40 and it is viewed from the light source. If the base member 40 is transparent or translucent, some of the light passes through the base member 40 while some of the light is reflected and the light having passed through the base member 40 presents the change of the brightness and darkness as the light reflected at the base member 40 does. Accordingly, the same change of the brightness and darkness is viewed if it is viewed from the behind of the base member 40.

The adjustment of the change of the polarization direction (for example, the rotation angle or rotation speed) of the light of the polarized light source 100 will adjust the change of the brightness and darkness to the polarization zone 80.

Figure 2:
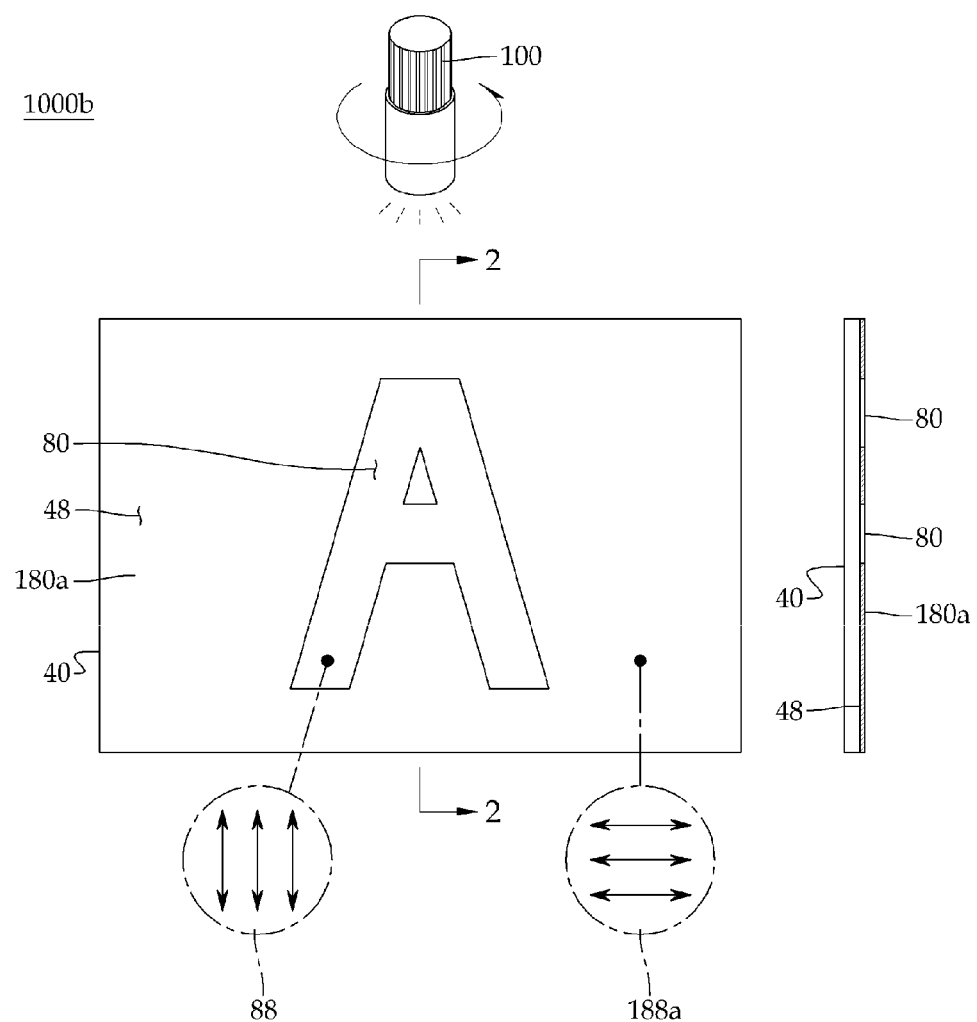
FIG. 2 shows a second embodiment of the display device having polarized light source according to the first aspect of the present invention.

FIG. 2 shows a display device having polarized light source 1000b of a second embodiment according to the first aspect of the present invention.

In the display device having polarized light source 1000b of the second embodiment according to the first aspect of the present invention, two polarization zones 80 and 180a are provided and the polarization directions of these polarization zones 80 and 180a are vertical to each other.

With respect to the first polarization zone 80 having the shape of letter A, the surrounding part forms the second polarization zone 180a and the polarization directions of the first polarization zone 80 and the polarization direction of the polarization zone 180a are vertical to each other.

For example, a polarization film having the shape of letter A is attached to form the first polarization zone 80. Then, a polarization film is attached to surround the first polarization zone 80 and have the polarization direction 188a vertical to the polarization direction 88 thereof and the second polarization zone 180a is formed.

As the polarization direction of the light emitted from the polarized light source 100 changes, the light cannot pass through the first polarization zone 80 if the polarization direction of the light comes to be vertical to the polarization direction of the first polarization zone 80 and then the light cannot pass through the second polarization zone 180a if the polarization direction of the light comes to be vertical to the polarization direction of the second polarization zone 180*a*.

In this case, since the polarization directions of the first polarization zone 80 and the second polarization zone 180*a* are vertical to each other, the polarization direction of the light emitted from the polarized light source 100 is horizontal to the polarization direction of the second polarization zone 180*a* if it is vertical to the polarization direction of the first polarization zone 80 and, reversely, it is horizontal to the polarization direction of the first polarization zone 80 if it is vertical to the polarization direction of the second polarization zone 180*a*.

Accordingly, in the two polarization zones 80 and 180*a* of the display device 1000*b* of the second embodiment, as they are illuminated by the polarized light source 100, one becomes bright while the other becomes dark or black as the light is blocked to pass through.

The adjustment of the change of the polarization direction (for example, the rotation angle or rotation speed) of the light emitted from the polarized light source 100 will adjust the change of the brightness and darkness between the polarization zones 80 and 180*a*.

Figure 3:
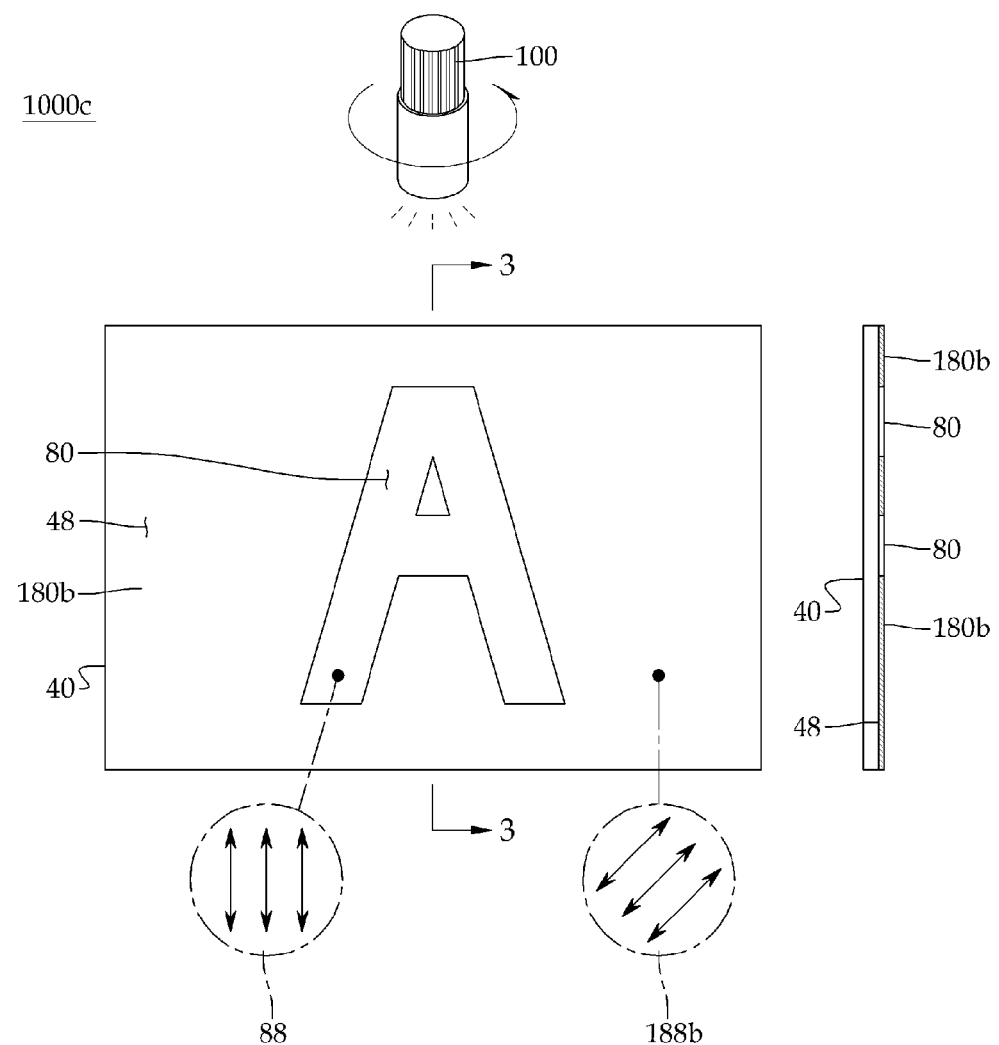
FIG. 3 shows a third embodiment of the display device having polarized light source according to the first aspect of the present invention.

FIG. 3 shows a display device having polarized light source 1000*c* of a third embodiment according to the first aspect of the present invention. In the display device having polarized light source 1000*c* of the third embodiment according to the first aspect of the present invention, two polarization zones 80 and 180*b* are provided and the polarization directions of the polarization zones 80 and 180*b* are 45° off each other. With respect to the first polarization zone 80 having the shape of letter A, the surrounding part forms the second polarization zone 180*b* and the polarization direction 88 of the first polarization zone 80 and the polarization direction 188*b* of the second polarization zone 180*b* are 45° off each other.

For example, the first polarization zone 80 is formed by attaching a polarization film having the shape of letter A. Then, the second polarization zone 180*b* is formed by attaching a polarization film to surround the first polarization zone 80 and form the polarization direction 188*b* to be 45° off the polarization direction of the first polarization zone 80.

As the polarization direction of the light from the polarized light source 100 changes, the light cannot pass through the first polarization zone 80 if the polarization direction of the light comes to be vertical to the polarization direction of the first polarization zone 80 and then the light cannot pass through the second polarization zone 180*b* if the polarization direction of the light comes to be vertical to the polarization direction of the second polarization zone 180*b*.

Accordingly, in the two polarization zones 80 and 180*b*, both of them become bright and one of them firstly becomes dark or black. In another case, both of them become dark and one of them firstly becomes bright. Along this way, it is possible to adjust the change of the brightness and darkness in the polarization zones 80 and 180*b* by adjusting the change of the polarization direction (for example, the rotation angle or rotation speed) of the light from the polarized light source 100.

Figure 4:
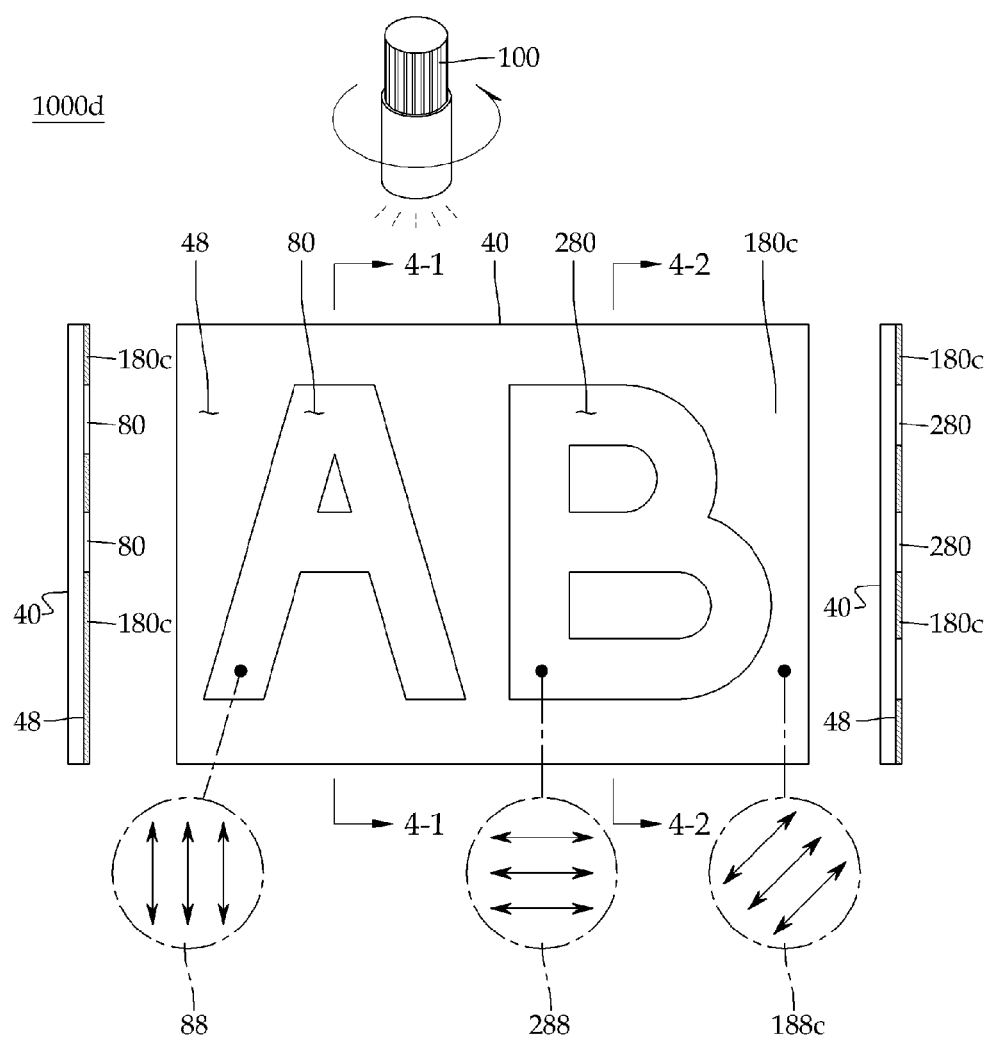
FIG. 4 shows a fourth embodiment of the display device having polarized light source according to the first aspect of the present invention.

FIG. 4 shows a display device having polarized light source 1000*d* of a fourth embodiment of the first aspect of the present invention.

In the display device having polarized light source 1000*d* of the fourth embodiment of the first aspect of the present invention, three polarization zones 80, 180*c* and 280 are provided and the polarization directions of the polarization zones 80, 180*c* and 280 are 45° off one another along their sequence of the arrangement.

For example, if the polarization direction 88 of the first polarization zone 80 is 90°, the polarization direction 188*c* of the second polarization zone 180*c* is 45° and the polarization direction 288 of the third polarization zone 280 is 0°.

Specifically, the first polarization zone 80 having the shape of letter A and the third polarization zone 280 having the shape of letter B are provided and the surrounding part of them forms the second polarization zone 180*c*, and the polarization directions 88, 188*c* and 288 of the polarization zones 80, 180*c* and 280 are sequentially 45° off one another along the arrangement.

For example, the first polarization zone 80 is formed by attaching a polarization film having the shape of letter A. The third polarization zone 280 is formed by attaching a polarization film having the shape of letter B to be arranged that the polarization direction 288 thereof is 90° off the polarization direction 88 of the first polarization zone 80. Then, the second polarization zone 180*c* is formed by attaching a polarization film to surround the first polarization zone 80 and the third polarization zone 280 and to be arranged that the polarization direction 188*c* thereof is 45° off the polarization direction 88 of the first polarization zone 80 and the polarization direction 288 of the third polarization zone 280, respectively.

As the polarization direction of the light emitted from the polarized light source 100 changes, the light cannot pass through the first polarization zone 80 if the polarization direction of the light comes to be vertical to the polarization direction of the first polarization zone 80, the light cannot pass through the second polarization zone 180*c* if the polarization direction of the light comes to be vertical to the polarization direction of the second polarization zone 180*c*, and then, the light cannot pass through the third polarization zone 280 if the polarization direction of the light comes to be vertical to the polarization direction of the third polarization zone 280.

Accordingly, the three polarization zones 80, 180*c* and 280 become bright or dark sequentially and it is possible to sequentially adjust the brightness and darkness of the polarization zones 80, 180*c* and 280 by adjusting the change of the polarization direction (for example, the rotation angle or rotation speed) of the light from the polarized light source 100.

Figure 5:
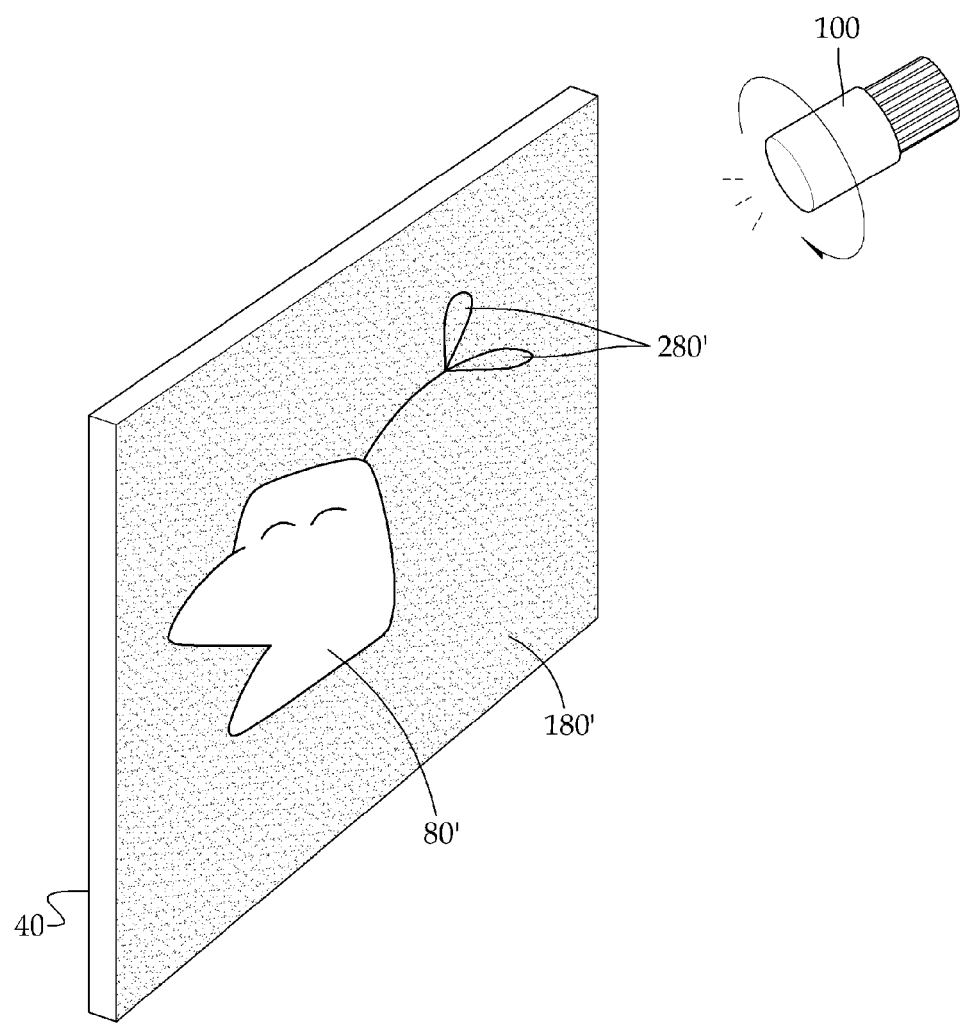
FIG. 5 shows that the polarization zones form a picture of character in the display device according to the first aspect of the present invention.

FIG. 5 shows that the polarization zones form a picture of character in the display device according to the first aspect of the present invention.

Three polarization zones 80', 180' and 280' are formed on the base member 40 and the polarization zone 80' forms a picture of the character, the polarization zone 280' forms a back hair and the polarization zone 180' forms the surrounding part.

The polarization directions of the adjoining polarization zones 80', 180' and 280' have sequential angular differences along the adjoining arrangement sequence. For example, the polarization direction of the polarization zone 80' is 90°, the polarization direction of the polarization zone 180' is 60° and the polarization direction of the polarization zone 280' is 30°.

As the polarization direction of the light emitted from the polarized light source 100 changes, the brightness and darkness of the three polarization zones 80', 180' and 280' sequentially changes.

It is possible to sequentially adjust the change of the brightness and darkness of the polarization zones 80', 180' and 280' by adjusting the change of the polarization direction (for example, the rotation angle or rotation speed) of the light emitted from the polarized light source 100.

According to the present invention, the speed of change or the range of the change (the angle of change) of the light emitted from the polarized light source 100 can be variously adjusted by considering the display effect.

Also, according to the present invention, the polarized light source 100 can be plural. If a plurality of the polarized light sources 100 is provided, there may need a control apparatus for synchronization to coincide the polarization directions of the lights emitted from the polarized light sources at initial time and prevents any discordance of the polarization directions of the lights as the change continues. This synchronization is not essential and, in some cases, the synchronization is avoided to present an unique effect. Meanwhile, the polarized light source using the liquid crystal device 400 in FIG. 25 may not need the synchronization.

According to the present invention, the polarization zone may have a color and, for example, the polarization film forming the polarization zone may have the color.

Meanwhile, the ground (the base member) of the polarization zone may have the color. If a plurality of the polarization zones is provided, it is possible to make the colors of the polarization zones different or make the color of the grounds (the base member) beneath the polarization zones different.

If the base member is transparent or translucent, the same change of the brightness and darkness is viewed if it is viewed from the behind of the base member 40.

The display device according to the present invention is applied to various field by various embodiments. For example, the polarization zone solely or the polarization zones together form a shape such as a picture, brand, or logo and the display device may be used for a signboard (advertisement board) or interior design and so forth.

FIGS. 6 to 10 shows a display device having polarized light source according to a second aspect of the present invention.

Figure 6:
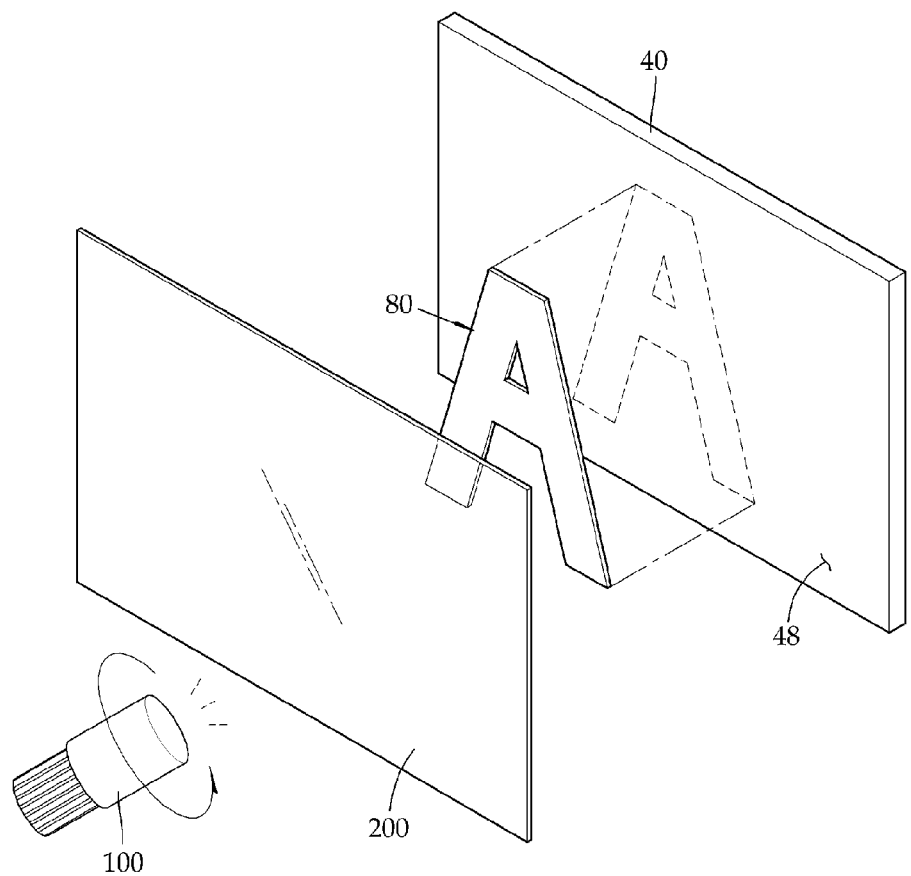
FIG. 6 shows a display device having polarized light source according to a second aspect of the present invention as an example.

FIG. 6 shows the display device having polarized light source according to the second aspect of the present invention as an example.

According to the second aspect of the present invention, a polarization zone 80 is provided and the polarization zone 80 is formed by light polarizing means.

In the present embodiment, a base member 40 is provided and the polarization zone 80 is formed on upper face 48 of the base member 40.

With reference to the drawings, a polarization film, a polarization plate or a polarization glass having the shape of letter A is attached to the upper face 48 of the base member 40 and it forms the polarization zone 80 having the shape of letter A.

As described as below, the polarization zone may be plural and, if a plurality of polarization zones is provided, it is preferable that the polarization directions of the adjoining polarization zones are different.

The display device having polarized light source 2000 according to the second aspect of the present invention has a polarized light source that emits polarized light and shines the polarization zone. FIGS. 6 to 10 show that the polarized light source 100 emitting the light of which the polarization direction changes as it rotates provided by the display device having polarized light source according to the first aspect of the present invention is used, however, it is not limited thereto as explained below.

According to the second aspect of the present invention, a birefringence medium 200 is disposed between the polarized light source 100 and the polarization zone 80.

According to the second aspect of the present invention, the polarization direction of the light emitted from the polarized light source, the birefringence medium 200 and the polarization zone 80 rotate relative to one another. This relative rotation includes below occasions.

Firstly, the polarization direction of the light emitted from the polarized light source and the birefringence medium 200 rotate relative to each other and the polarization zone 80 is stationary. This includes that one of the polarization direction of the light emitted from the polarized light source and the birefringence medium 200 is stationary and the other rotates, and that both of them rotate and their rotation speeds are different.

At this time, the polarized light source 100 provided by the display device having polarized light source according to the first aspect of the present invention is to emit the light that its polarization direction changes as the polarization direction rotates. Accordingly, if it is used provided that the birefringence medium 200 and the polarization zone 80 are stationary, it is included in this first occasion.

Figure 27:
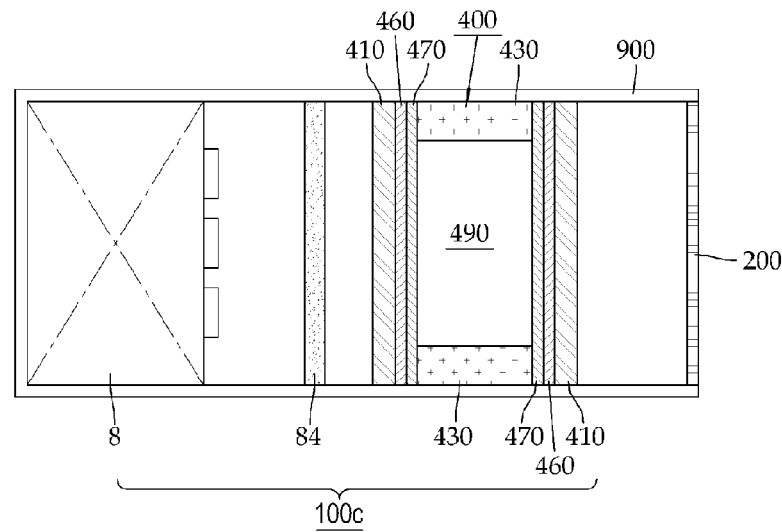
FIG. 27 shows that a birefringence medium is arranged in front of the liquid crystal device with respect to the polarized light source so that the polarization direction of the polarized light source rotates and the birefringence medium is stationery.

As shown in FIG. 27, if the birefringence medium 200 is arranged in front of the liquid crystal device 400 in the case 900 with respect to the polarized light source 100*c* in FIG. 26, it is included in the occasion that the polarization direction of the polarized light source 100*c* rotates and the birefringence medium 200 is stationary.

Secondly, the polarization direction of the light emitted from the polarized light source is constant and the birefringence medium 200 and the polarization zone 80 rotate relative to each other. This also includes that one of the birefringence medium 200 and the polarization zone 80 is stationary and the other rotates, and that both of them rotate and their rotation speeds are different.

Figure 24:
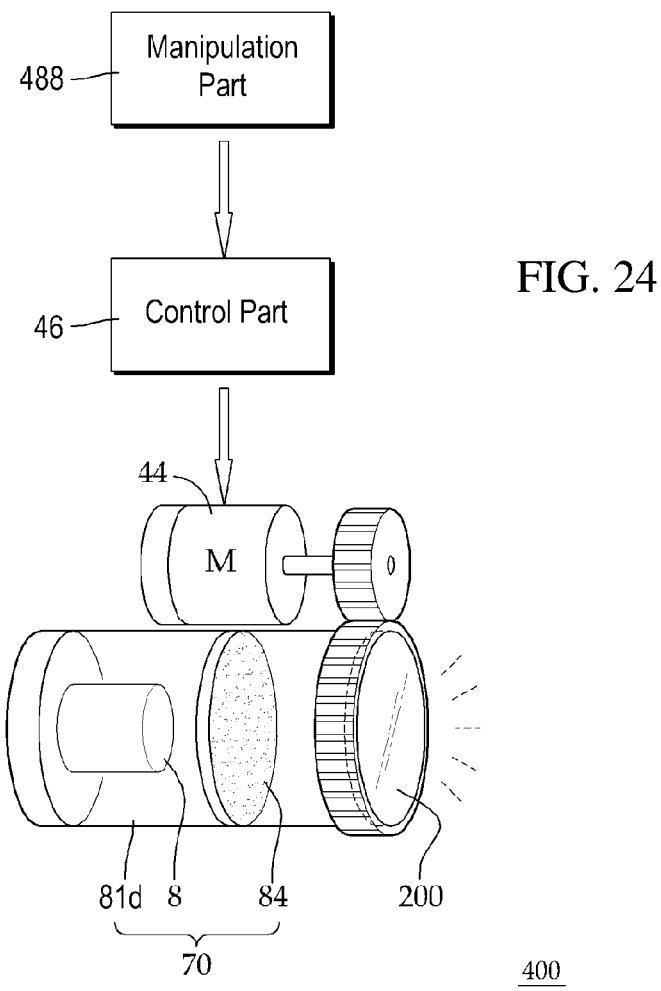
FIG. 24 shows a structure that birefringence medium is arranged in front of the polarized light source emitting the polarized light to be rotatable.

At this time, as shown in FIG. 24, with respect to a polarized light source 70 having a light source 8 in a body part 81*d* and the light polarizing means 84 arranged in front of the light source 8 and emitting polarized light, if a birefringence medium 200 is arranged in front of the light polarizing means 84 to be rotatable and the birefringence medium 200 rotates by means of the motor 44, it is included in the occasion that the polarization direction of the polarized light source 70 is constant and the birefringence medium 200 rotates.

In this case, a manipulation part 488 for manipulating the rotation of the motor 44 and the control part 46 for controlling the rotation of the motor 44 may be provided. Accordingly, it is possible to adjust the range of the rotation (rotation angle) and the rotation speed of the birefringence medium 200.

Thirdly, the birefringence medium 200 is stationary and the polarization direction of the light emitted from the polarized light source and the polarization zone 80 rotate relative to each other. This also includes that one of the polarization direction of the light emitted from the polarized light source and the polarization zone is stationary and the other rotates and that both of them rotate and their rotation speeds are different.

At this time, the polarized light source 100 provided by the display device having polarized light source according to the first aspect of the present invention is to emit the light where its polarization direction changes according to the rotation thereof. Accordingly, if it is used provided that the birefringence medium 200 is stationary, and the polarization zone 80 is stationary or the polarization zone 80 rotates with different speed from the speed of the rotation of the polarization direction of the light emitted from the polarized light source 80, it is included in this third occasion.

Fourthly, all of the polarization direction of the light emitted from the polarized light source, the birefringence medium 200 and the polarization zone 80 rotate and their rotation speeds are different. In this occasion, the polarized light source 100 provided by the first aspect of the invention can be used.

Fifthly, the polarization direction of the light emitted from the polarized light source and the birefringence medium 200 rotate together and the polarization zone 80 is stationary.

If the birefringence medium 200 is arranged in front of the polarized light source 100a in FIG. 22 with respect to the polarized light source 100a in FIG. 22, it is the example that the polarization direction of the polarized light source and the birefringence medium 200 rotate together. Specifically, a film type of the birefringence medium 200 is attached to the front surface of the light polarizing means 84 made of the polarization film in the polarized light source 100a in FIG. 22.

Another example that the polarization direction of the polarized light source and the birefringence medium 200 rotate together is that a film type of the birefringence medium 200 is attached to the front surface of the light polarizing means 84 rotated by the motor 44 in the polarized light source 100b in FIG. 23.

Sixthly, the polarization direction of the light emitted from the polarized light source is constant and the birefringence medium 200 and the polarization zone 80 rotate together.

With respect to these occasions, FIG. 6 shows that the polarized light source 100 emitting the light where its polarization direction changes as the polarization direction rotates is provided and the birefringence medium 200 and the polarization zone 80 are stationary.

The birefringence medium 200 can be placed at various positions between the polarized light source 100 and the polarization zone 80. A film type or a plate type of the birefringence medium 200 can be attached to the surface of the polarization zone 80 or can be arranged in the polarized light source 100 as shown in FIG. 27.

It is possible to provide the polarized light source 70 emitting the polarized light and equip the birefringence medium 200 in front of the polarized light source 70 to be rotatable as shown in FIG. 24. In this case, the polarized light source is stationary so that the polarization direction of the emitted light is constant and the birefringence medium 200 rotates, which results in its relative rotation to the polarization zone 80.

The birefringence medium 200 is to double-refract light. An OPP film or a cellophane film having the double-refraction property can be used therefor, or a birefringence film specially produced for the double refraction can be used therefor. Birefringence plate or birefringence lens can be also used for the birefringence medium.

According to the present invention, the relative rotation between the polarization direction of the light from the polarized light source, the birefringence medium 200 and the polarization zone 80 includes the partial rotation to an angle. For example, it includes the rotation of 30°, 60°, 90° or 180° and so forth.

According to the display device having polarized light source 2000 according to the second aspect of the present invention, the polarized light emitted from the polarized light source 100 is transmitted to the birefringence medium 200 and it is double-refracted, then, it comes to have different polarization directions according to the wavelengths as it passes through the birefringence medium 200. The light having the different polarization directions according to the wavelengths is transmitted to the polarization zone 80.

When the light having the different polarization directions according to the wavelengths is transmitted to the polarization zone 80, the light of the wavelengths the polarization directions of which are vertical to the polarization direction of the polarization zone 80 cannot pass through the polarization zone 80 and the light of the other wavelengths can pass through wholly or partially according to their polarization directions so that colors according to the wavelengths having passed through the polarization zone 80 are mixed and a particular color appears on the polarization zone 80.

By the way, according to the present invention, as the polarization direction of the light emitted from the polarized light source 100 and illuminated to the birefringence medium 200 changes, the differed polarization directions themselves according to the wavelengths changes as the light passes through the birefringence medium 200, accordingly, and the light transmitted to the polarization zone 80 is on the state that the polarization directions according to the wavelengths are different from one another and the polarization directions themselves according to the wavelengths change. As a result, the color appeared on the polarization zone 80 changes as the polarization direction of the polarized light source 100 changes.

It is the same case if the birefringence medium 200 rotates. As the polarized light emitted from the polarized light source 100 travels through the rotating birefringence medium 200, the polarization directions according to the wavelengths become different and the polarization direction according to the wavelengths changes. Accordingly, the color appeared on the polarization zone 80 by the mix of the colors according to the wavelengths changes.

The change of the color on the polarization zone happens if the polarization direction of the light emitted from the polarized light source, the birefringence medium 200 and the polarization zone 80 rotate relative to one another.

If the polarization zone is plural, different colors appear as they change between the polarization zones the polarization directions of which are different from one another. This is illustrated as below.

Figure 7:
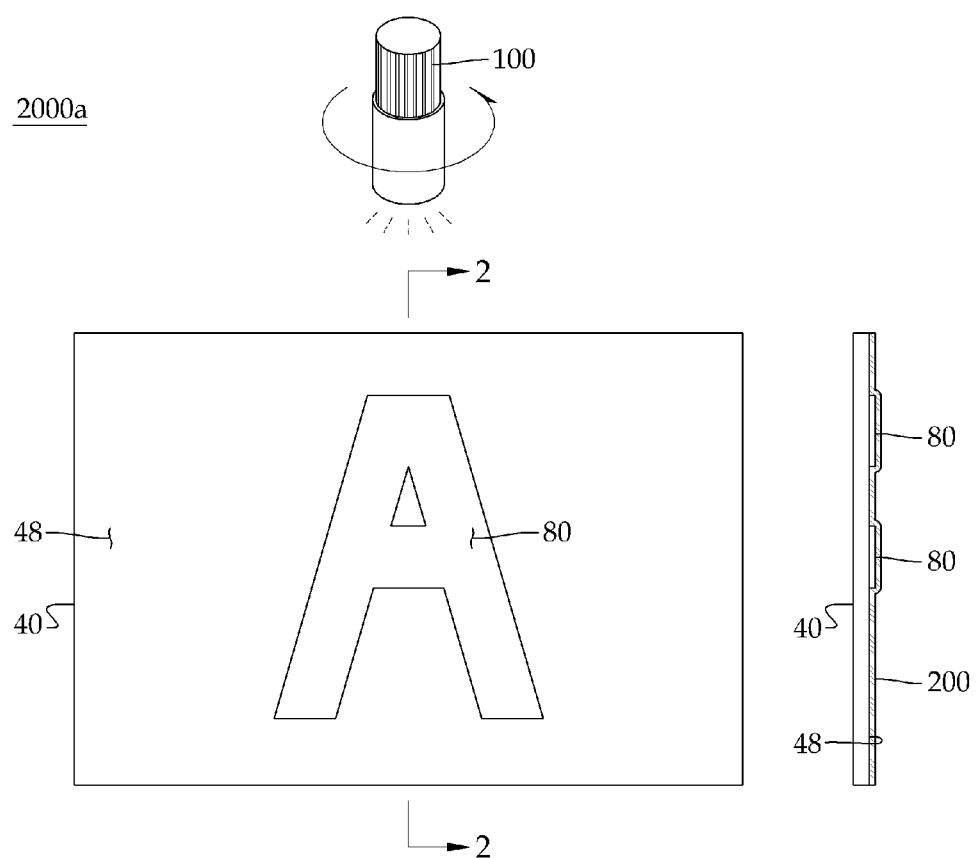
FIG. 7 shows a first embodiment of the display device having polarized light source according to the second aspect of the present invention.

FIG. 7 shows a first embodiment 2000a of the display device having polarized light source according to the second aspect of the present invention.

As shown, a polarization zone 80 having the shape of letter A is formed on the upper face 48 of a base member 40 and a birefringence medium 200 is attached to the upper surface thereof.

It is not necessary that the birefringence medium 200 covers all the surface of the base member 40. It is sufficient that it covers the polarization zone 80.

In the present embodiment, a polarized light source 100 emitting light the polarization direction of which changes is provided to illuminate the polarization zone 80. According to the present invention, the polarized light source may be plural.

The first embodiment 2000a of the display device having polarized light source according to the second aspect of the present invention operates as below.

The light the polarization direction of which changes emitted from the polarized light source 100 travels through the birefringence medium 200 and is transmitted to the polarization zone 80.

The light emitted from the polarized light source 100 and having passed through the birefringence medium 200 comes to have different polarization directions according to the wavelengths and the different polarization directions according to the wavelengths change according to the rotation of the polarization direction of the polarized light source.

When the light having the different polarization directions according to the wavelengths where the polarization directions change is transmitted to the polarization zone 80, the light of the wavelengths the polarization directions of which are vertical to the polarization direction of the polarization zone 80 cannot pass through the polarization zone 80 and the light of the other wavelengths can pass through wholly or partially according to their polarization directions so that colors according to the wavelengths having passed through the polarization zone 80 is mixed and a particular color appears on the polarization zone 80. The color appeared on the polarization zone 80 makes a change due to the change of the polarization directions of the incident light. That is, the color is presented on the polarization zone 80 and the presented color changes according to the change of the polarization direction of the light emitted from the polarized light source.

If the base member 40 has a color, the mixed color of the color of the base member 40 and the color of the light having passed through the polarization zone 80 may appear.

The above description is directed to the case that the light is reflected at the base member 40 and it is viewed from the light source. If the base member 40 is transparent or translucent, some of the light passes through the base member 40 while some of the light is reflected and the light having passed through the base member 40 presents the same change of color as the light reflected at the base member 40. Accordingly, the same change of the color is viewed if it is viewed from the behind of the base member 40.

The adjustment of the change of the polarization direction (for example, the range of rotation (rotation angle) or rotation speed) of the light emitted from the polarized light source 100 will adjust the change of the color presented on the polarization zone 80.

Figure 8:
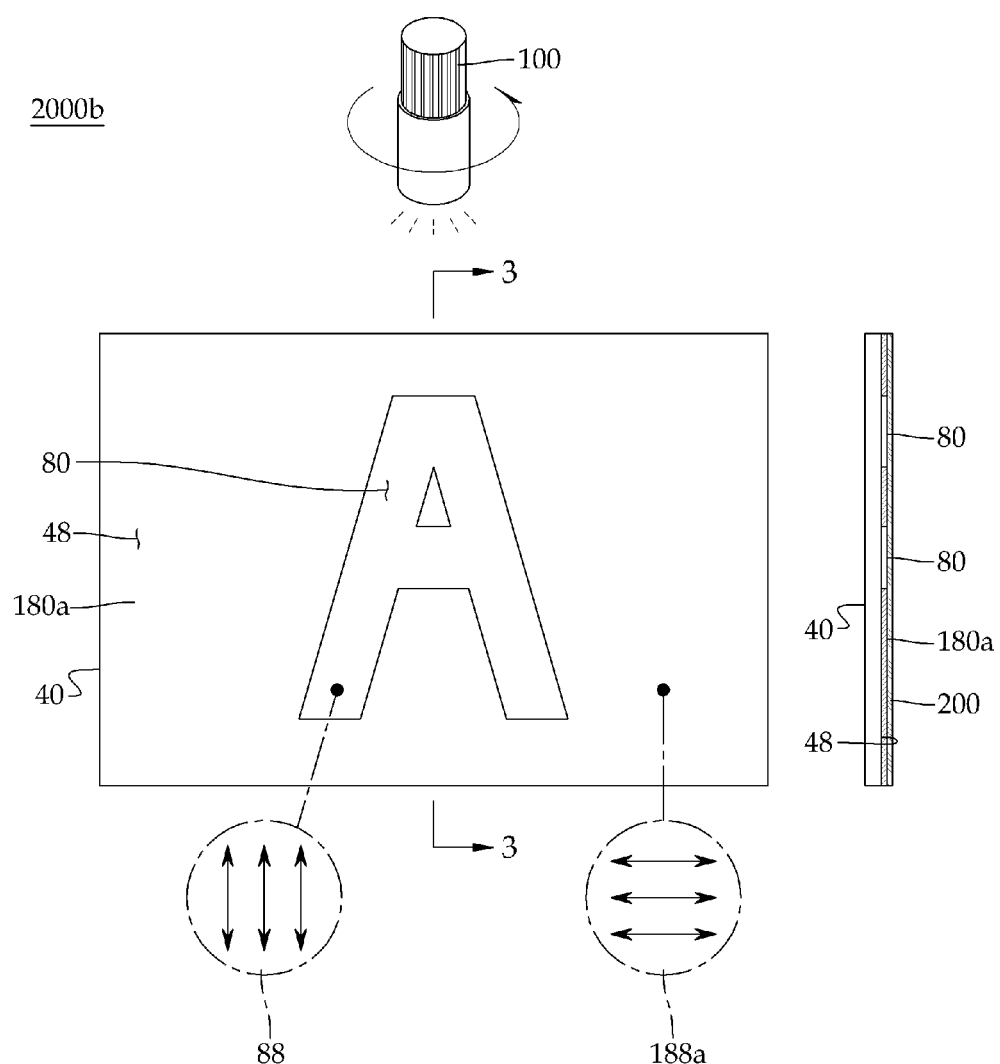
FIG. 8 shows a second embodiment of the display device having polarized light source according to the second aspect of the present invention.

FIG. 8 shows a second embodiment 2000*b* of the display device having polarized light source according to the second aspect of the present invention.

According to the display device having polarized light source 2000*b* according to the present second embodiment, two polarization zones 80 and 180*a* are provided and their polarization directions are vertical to each other.

With respect to the first polarization zone 80 having the shape of letter A, the surrounding part forms the second polarization zone 180*a* and the polarization direction 88 of the first polarization zone 80 and the polarization direction 188*a* of the second polarization zone 180*a* are vertical to each other.

For example, the first polarization zone 80 is formed by attaching a polarization film having the shape of A and the second polarization zone 180*a* is formed by attaching a polarization film to surround the first polarization zone 80 and have its polarization direction 188*a* vertical to the polarization direction 88 of the first polarization zone 80.

A film type of the birefringence medium 200 is attached to the surface of the two polarization zones 80 and 180*a*.

As the polarization directions of the polarization zones 80 and 180*a* are different, the wavelengths of light passing through each of the zones become different and different colors are presented as they change on each of the zones, and the color appeared on the one zone appears on the other zone with time lag as the polarization direction of the light emitted from the polarized light source 100 rotates.

By adjusting the change of the polarization direction (for example, the range of rotation or rotation speed) of the light emitted from the polarized light source 100, it is possible to adjust the change of colors presented on the polarization zones 80 and 180*a*.

Figure 9:
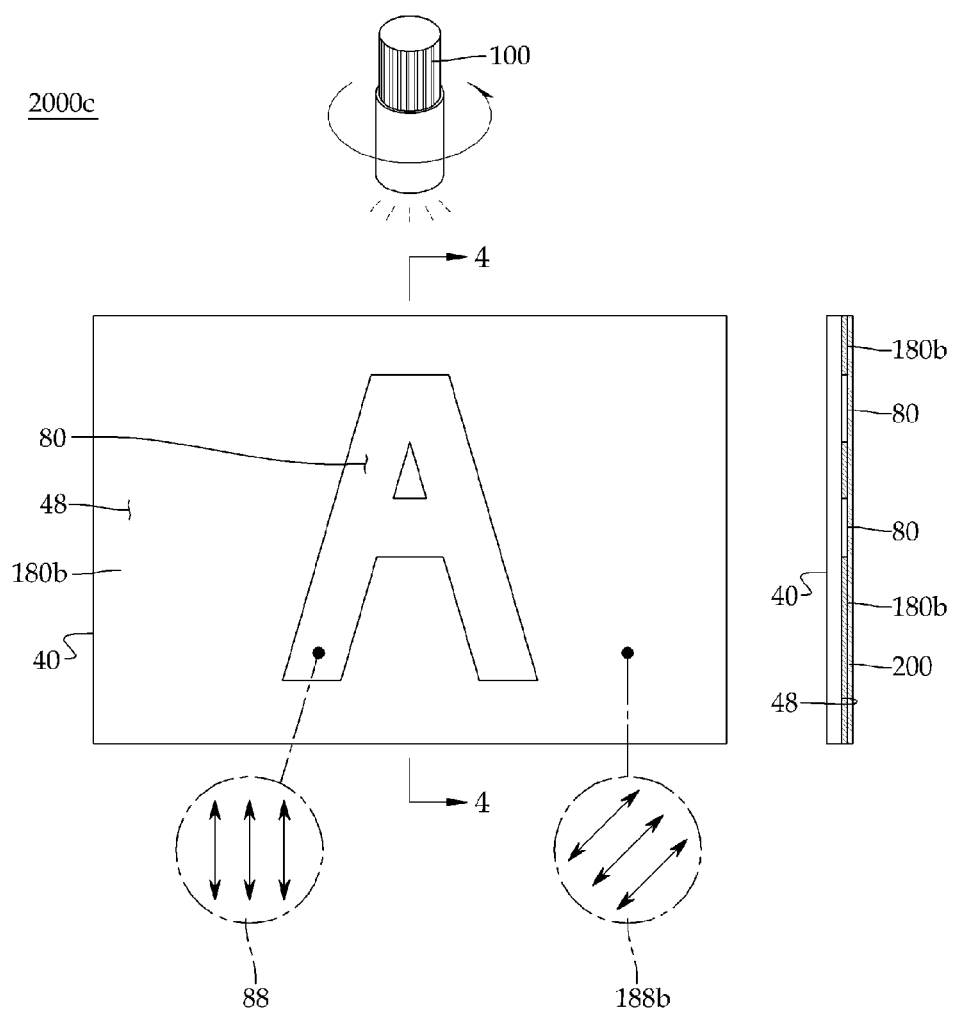
FIG. 9 shows a third embodiment of the display device having polarized light source according to the second aspect of the present invention.

FIG. 9 shows a third embodiment 2000*c* of the display device having polarized light source according to the second aspect of the present invention.

In the display device having polarized light source 2000*c* according to the present third embodiment, two polarization zones 80 and 180*b* are provided and the polarization directions of the polarization zones 80 and 180*b* are 45° off each other.

With respect to the first polarization zone 80 having the shape of letter A, the surrounding part forms the second polarization zone 180*b* and the polarization direction 88 of the polarization zone 80 and the polarization direction 188*a* of the polarization zone 180 are 45° off each other.

For example, the first polarization zone 80 is formed by attaching a polarization film having the shape of A and the second polarization zone 180*b* is formed by attaching a polarization film to surround the first polarization zone 80 and form its polarization direction 188*b* to be 45° off the polarization direction 88 of the first polarization zone 80.

A film type of the birefringence medium 200 is attached to the surface of the two polarization zones 80 and 180*b*.

As the polarization directions of the polarization zones 80 and 180*b* are different, the wavelengths of light passing through each of the zones become different and different colors are presented as they change on each of the zones, and the colors sequentially change as the polarization direction of the light emitted from the polarized light source 100 rotates.

By adjusting the change of the polarization direction (for example, the range of rotation or rotation speed) of the light emitted from the polarized light source 100, it is possible to adjust the change of colors presented on the polarization zones 80 and 180*b*.

Figure 10:
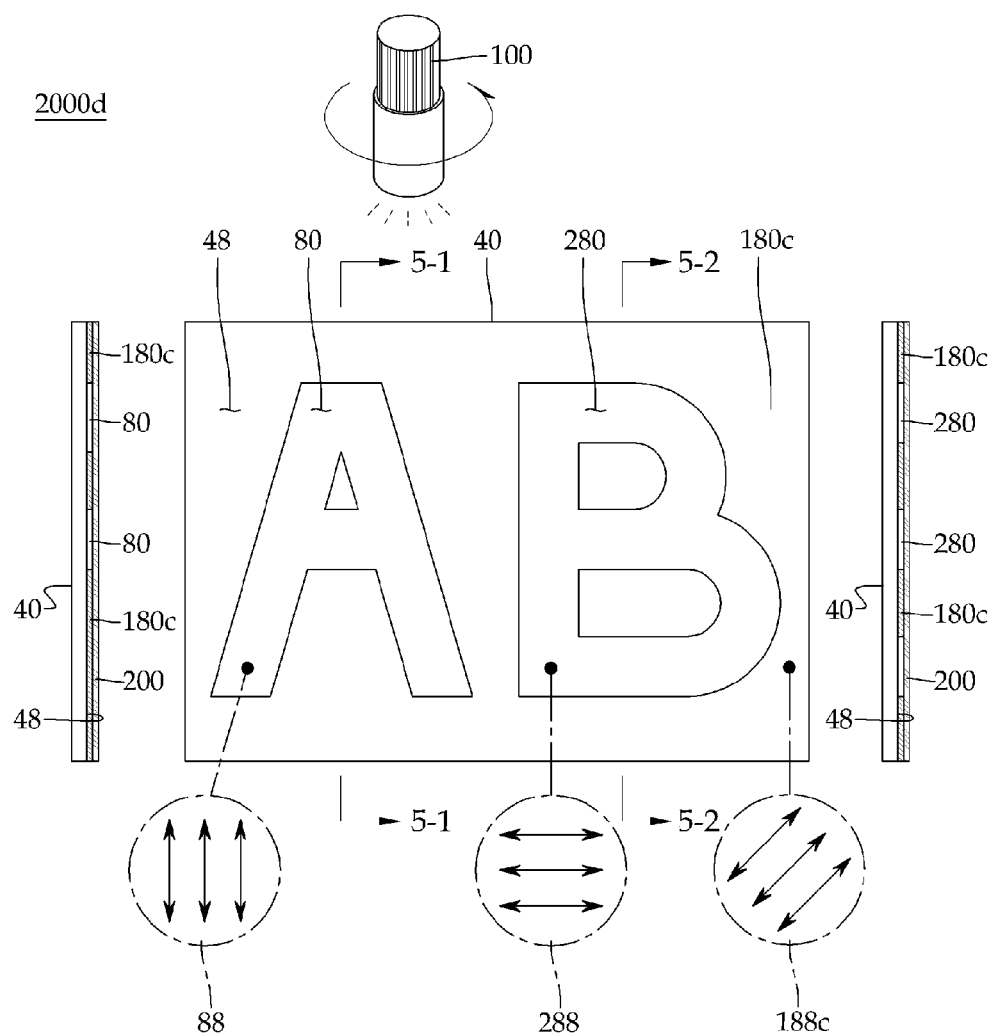
FIG. 10 shows a fourth embodiment of the display device having polarized light source according to the second aspect of the present invention.

FIG. 10 shows a fourth embodiment 2000*d* of the display device having polarized light source according to the second aspect of the present invention.

In the display device having polarized light source 2000*d* according to the present fourth embodiment, three polarization zones 80, 180*c* and 280 are provided and the polarization directions of the polarization zones 80, 180*c* and 280 are 45° off one another along their sequence of arrangement. For example, if the polarization direction 88 of the first polarization zone 80 is 90°, the polarization direction 188*c* of the second polarization zone 180*c* is 45° and the polarization direction 288 of the third polarization zone 280 is 0°.

The first polarization zone 80 having the shape of letter A and the third polarization zone 280 having the shape of letter B are provided and the surrounding part of them forms the second polarization zone 180*c*, and the polarization directions 88, 188*c* and 288 of the polarization zones 80, 180*c* and 280 are 45° off one another along their sequence of the arrangement.

For example, the first polarization zone 80 is formed by attaching a polarization film having the shape of letter A. The third polarization zone 280 is formed by attaching a polarization film having the shape of letter B to be arranged that the polarization direction 288 thereof is 90° off the polarization direction 88 of the first polarization zone 80. Then, the second polarization zone 180*c* is formed by attaching a polarization film to surround the first polarization zone 80 and the third polarization zone 280 and to be arranged that the polarization direction 188*c* thereof is 45° off the polarization direction 88 of the first polarization zone 80 and the polarization direction 288 of the third polarization zone 280, respectively.

A film type of the birefringence medium 200 is attached to the front surface of the three polarization zones 80, 180*c* and 280.

As the polarization directions of the polarization zones 80, 180*c* and 280 are different, the wavelengths of light passing through each of the zones become different and different colors which make a change are presented on each of the zones, and, according to the present embodiment, the colors sequentially change along the polarization zones 80, 180*c* and 280.

By adjusting the change of the polarization direction (for example, the range of rotation or rotation speed) of the light emitted from the polarized light source 100, it is possible to adjust the change of colors presented on the polarization zones 80, 180*c* and 280.

If the base member 40 has a color, the mixed color of the color of the base member 40 and the color of the light having passed through the polarization zones may appear on each of the polarization zones 80, 180*c* and 280.

The above description is directed to the case that the light is reflected at the base member 40 and it is viewed from the light source. If the base member 40 is transparent or translucent, some of the light passes through the base member 40 while some of the light is reflected at the base member 40 and the light having passed through the base member 40 presents the same change of color as the light reflected at the base member 40. Accordingly, the same change of the color is viewed if it is viewed from the behind of the base member 40.

According to the present invention, the polarized light source can be plural.

The display device having polarized light source according to the second aspect of the present invention is applied to various fields by various embodiments. For example, it is possible to make the polarization zone solely or the polarization zones together form a shape such as a picture, brand, or logo, and make colors appeared as they change thereon so that the display device having polarized light source may be used for a signboard (advertisement board) or interior design and be available for various filed such as advertisement or promotion and so forth.

The display device having polarized light source according to the second aspect of the present invention is that the colors of the polarization zones are presented and they change if it is compared with the first aspect. Accordingly, it can provide more various colorful expression than the display device having polarized light source according to the first aspect.

The display device having polarized light source according to the present invention can present the change of the brightness and darkness or of the color on the glass window of the building if the polarization zone is disposed thereon. This is used for a kind of signboard or to add the beauty of the building. This is also the case of a third and fourth aspects of the present invention. The second, third and fourth aspects of the present invention may be more appropriate to that case because they provide the various colors. Besides them, the present invention may be used variously.

Also, it is possible to combine the change of the brightness and darkness according to the first aspect and the change of the color according to the second aspect and obtain unique display effect.

According to the present invention, the illuminated light from the polarized light source to the polarization zone may lose some of the intensity, however, it does not cause any visual disturbance. That means, the white light can be used for the illumination and its color does not change so that no visual disturbance happens. Accordingly, if the display device having polarized light source according to the present invention is equipped, people can enjoy their ordinary life without being visually disturbed. Therefore, the present invention provides the display device having polarized light source where the illuminated light does not cause any visual disturbance while various color change is presented with the particular zone to which the light is illuminated.

FIGS. 11 to 15 shows a display device having polarized light source according to a third aspect of the present invention.

Figure 11:
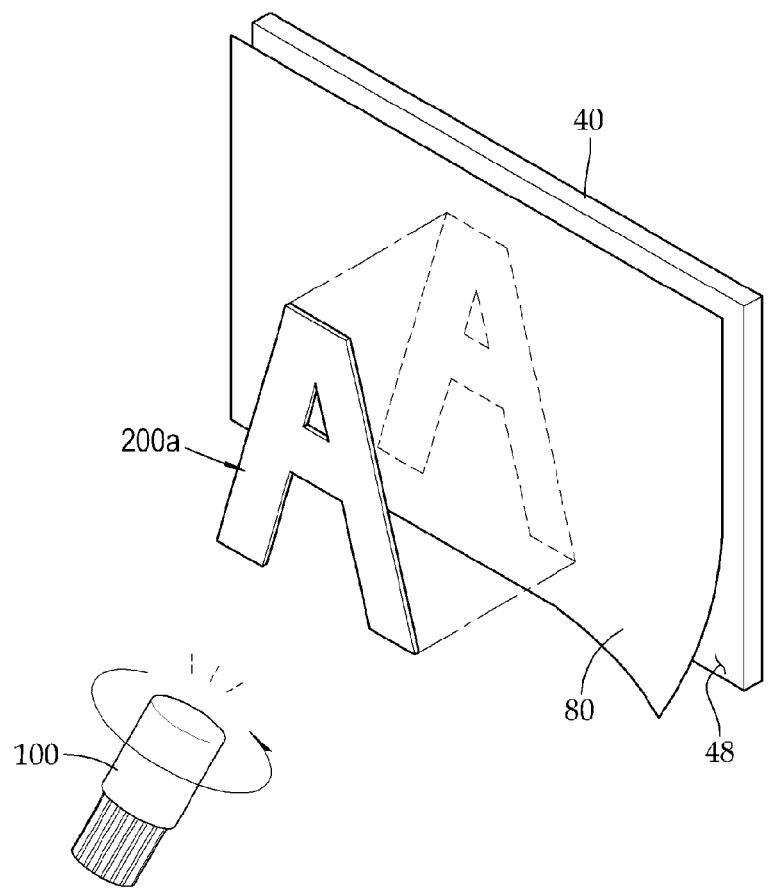
FIG. 11 shows a display device having polarized light source according to a third aspect of the present invention as an example.

FIG. 11 shows an example of the display device having polarized light source 2000' according to the third aspect of the present invention.

According to the third aspect of the present invention, a birefringence zone 200*a* is provided and the birefringence zone 200*a* is formed by a birefringence medium that double-refracts light incident thereto. With reference to FIG. 11, the birefringence zone 200*a* includes a birefringence film having the shape of letter A. A plurality of the birefringence zones having different birefringence characteristics therebetween may be provided as described below.

According to the third aspect of the present invention, a polarized light source emitting polarized light of which the polarization direction changes is provided and the polarized light source 100 provided by the first aspect of the present invention can be used therefor. The polarized light source 100 shines the birefringence zone 200*a*.

According to the third aspect of the present invention, a polarization zone 80 made up of polarizing means for polarizing light is provided behind the birefringence zone 200*a*.

The polarization zone 80 comprises the polarizing means such as a polarization film, a polarization plate or a polarizing glass. In the display device having polarized light source 2000' according to the third aspect of the present invention, the polarization zone 80 is made up of the polarization film and is attached to the base member 40.

A various types of the birefringence media can be used for the birefringence zone 200*a*. In the display device having polarized light source 2000' according to the third aspect of the present invention, a film type or a plate type is used and it is attached to the surface of the polarization zone 80 attached to the base member 40.

The film type of the birefringence medium includes an OPP film or a cellophane film and so forth that has the double-refraction property. A birefringence film specially produced for the double refraction or the birefringence plate can be used for the birefringence medium.

According to the display device having polarized light source 2000' of the third aspect of the present invention, the light emitted from the polarized light source 100 is transmitted to the birefringence zone 200*a* and is double-refracted, and it comes to have different polarization directions according to the wavelengths as it passes therethrough. Then, the light having the different polarization directions according to the wavelengths is transmitted to the polarization zone 80.

When the light having the different polarization directions according to the wavelengths is transmitted to the polarization zone 80, the light of the wavelengths of which the polarization directions are vertical to the polarization direction of the polarization zone 80 cannot pass through the polarization zone 80 and the light of the other wavelengths can pass through wholly or partially according to their polarization directions. As a result, colors according to the wavelengths having passed therethrough are mixed and a particular color appears on the birefringence zone 200*a*.

If the plural birefringence zones having the different birefringence characteristics are provided, the polarization directions according to the wavelengths of the light having traveled through the birefringence zones become different between the birefringence zones according to the different birefringence characteristics of them, and different colors appear on each of the birefringence zones.

By the way, according to the third aspect of the present invention, as the polarization direction of the light emitted from the polarized light source 100 and illuminated to the birefringence zone 200*a* changes, the differed polarization directions according to the wavelengths change as the light passes through the birefringence zone 200*a* and the light transmitted to the polarization zone 80 is on the state that the polarization directions according to the wavelengths are different and the polarization directions themselves according to the wavelengths change. As a result, the color appeared on the birefringence zone 200*a* changes as the polarization direction of the polarized light source 100 changes.

If the plural birefringence zones having the different birefringence characteristics are provided, different colors appear as they change between the birefringence zones. This is illustrated as below.

Figure 12:
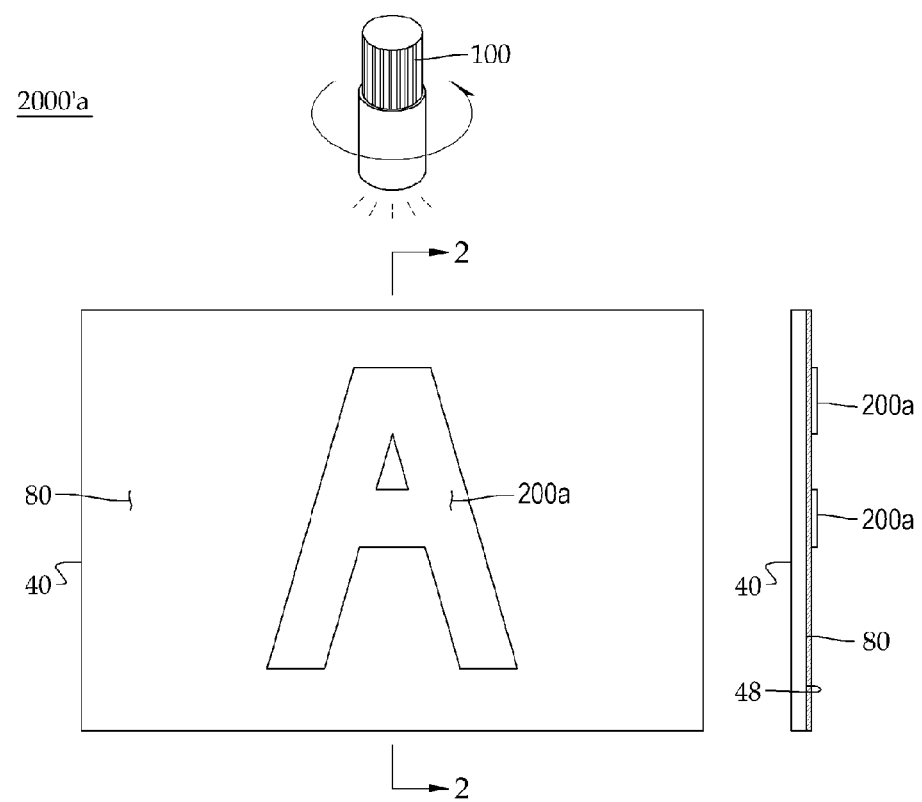
FIG. 12 shows a first embodiment of the display device having polarized light source according to the third aspect of the present invention.

FIG. 12 shows a first embodiment 2000'*a* of the display device having polarized light source according to the third aspect of the present invention.

A polarization zone 80 is formed on a base member 40 and a birefringence film having the shape of letter A is attached to the surface thereof to form the birefringence zone 200*a*. For the birefringence film for the birefringence zone 200*a*, the OPP film or cellophane film having the double-refraction property may be used as described above. The birefringence film or birefringence plate specially produced for the double refraction may also be used therefor.

The polarized light source 100 emits the polarized light the polarization direction of which changes. The emitted light is illuminated to the birefringence zone 200*a* and a color making a change appears on the birefringence zone 200*a* according to the change of the polarization direction of the emitted light from the polarized light source 100.

By adjusting the change of the polarization direction (for example, the range of rotation (rotation angle) or rotation speed) of the light emitted from the polarized light source 100, it is possible to adjust the change of color presented on the birefringence zone 200*a*.

If the base member 40 is transparent or translucent, some of the light passes through the base member 40 while some of the light is reflected at the base member 40 and the light having passed through the base member 40 presents the same change of color as the light reflected at the base member 40. Accordingly, the same change of the color is viewed if it is viewed from the behind of the base member 40.

Figure 13:
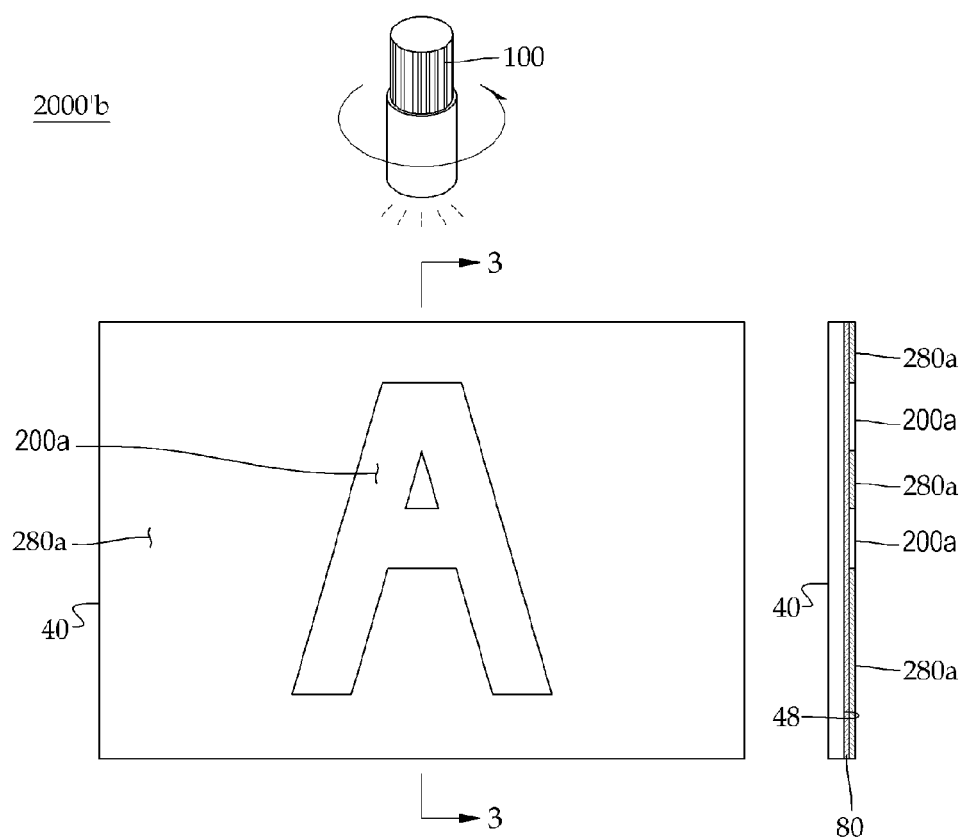
FIG. 13 shows a second embodiment of the display device having polarized light source according to the third aspect of the present invention.

FIG. 13 shows a second embodiment 2000'*b* of the display device having polarized light source according to the third aspect of the present invention.

According to the second embodiment 2000'*b* of the third aspect of the present invention, two birefringence zones 200*a* and 280*a* are provided and their birefringence characteristics are different. That is, with respect to the first birefringence zone 200*a* having the shape of letter A, the surrounding part forms the second birefringence zone 280*a* and the birefringence characteristics of them are different from each other.

The birefringence characteristics refer to characteristics causing the different double refraction. Such birefringence characteristics include a refraction angle (speed in the medium), refraction direction or propagation distance in the birefringence medium, of the respective refracted light by the double refraction of the incident light to the birefringence medium.

If the different birefringence medium is used, the birefringence characteristics become different. (For example, the material is different such as the cellophane film or the OPP film) The birefringence characteristics of the same birefringence medium become different if the thickness or the direction of the arrangement is different. (For example, placing it to the horizontal direction or to the vertical direction) If the sequence of the stacking is different, the birefringence characteristics become different. (For example, as for the birefringence media A and B, the stacking along the different sequences such as A-B or B-A)

For the birefringence zones 200*a* and 280*a*, it is possible to make their birefringence characteristics different by using the different materials. For example, one is made up of cellophane film and the other is made up of OPP film.

Further, even the same birefringence medium can have the different birefringence characteristics if the thickness is different. In this regards, the thickness becomes different if the number of the layer is different. For example, the birefringence zone 200*a* is made up of 1 layer while the birefringence zone 280*a* is made up of 2 layers.

By making the direction of the arrangement different, even the same birefringence medium can have the different birefringence characteristics. For example, even though they are cut from the same whole birefringence film, one is cut along the horizontal direction and the other is cut along the vertical direction.

Figure 15:
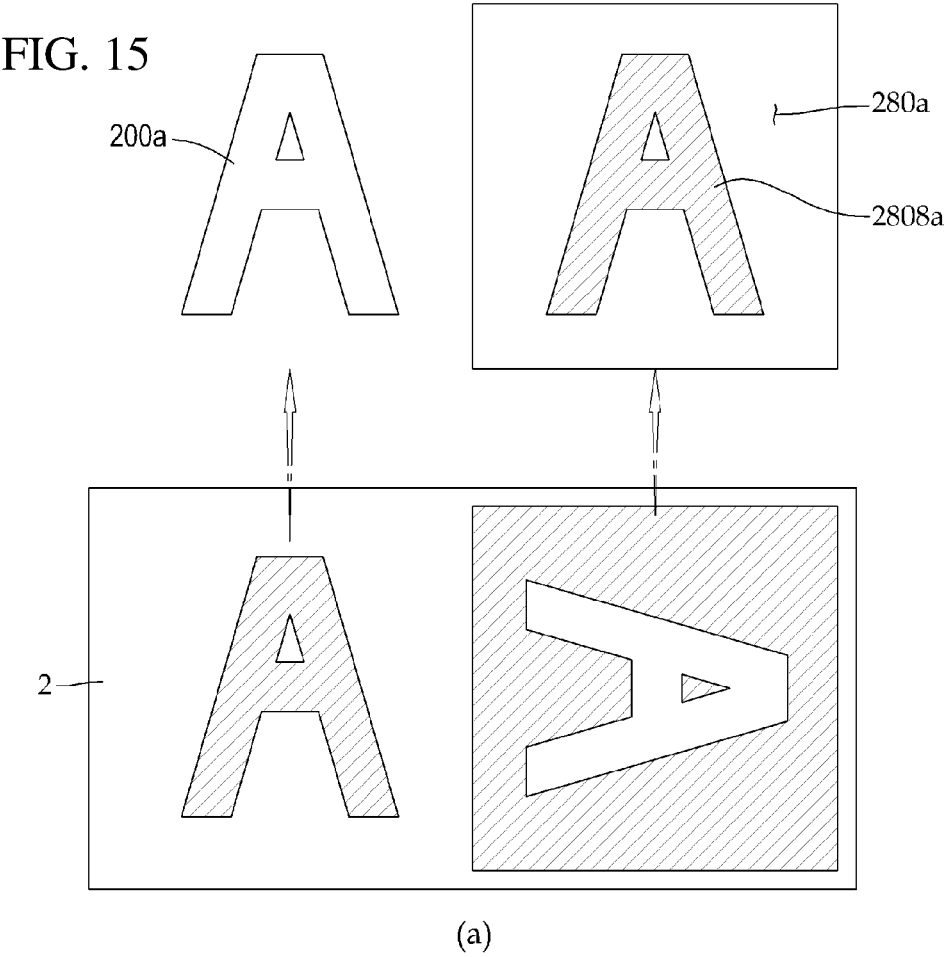
FIG. 15 shows that birefringence zones are cut from a birefringence film to have different directions of the arrangement.
Figure 15:
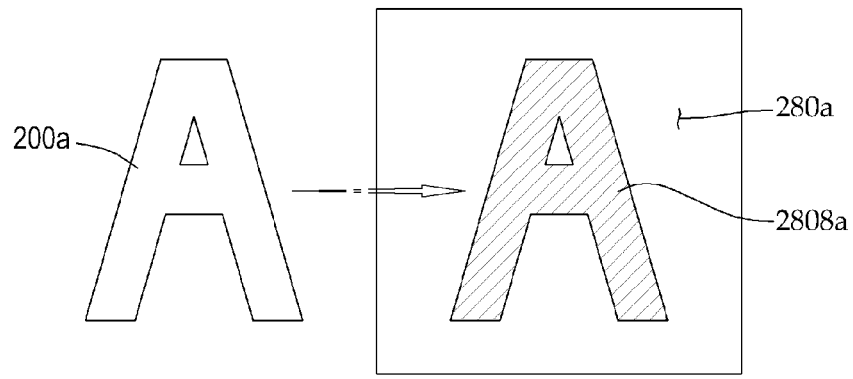

For example, as shown in FIG. 15, the birefringence zone 200*a* is made by cutting the letter A standing along the vertical direction from the same whole birefringence film 2. The birefringence zone 280*a* is cut after letter A is arranged to the horizontal direction. (FIG. 15(*a*)) In this drawing, the shaded area indicates the void part by cutting out it.

After the cutting, the birefringence zone 200*a* is placed into the void part 2808*a* of the birefringence zone 280*a*. The directions of the arrangement of them are different and their birefringence characteristics become different. (FIG. 15(*b*))

In FIG. 13, a polarization zone 80 comprising a polarization film is arranged on the rear face of the two birefringence zones 200*a* and 280*a*.

In this case, the light emitted from the polarized light source 100 and passing through the birefringence zones 200*a* and 280*a* comes to have the different polarization directions according to the wavelengths at each of the birefringence zones 200*a* and 280*a*. The polarization directions according to the wavelengths of the light having passed through each of the birefringence zones 200*a* and 280*a* become different due to the different birefringence characteristics between birefringence zones 200*a* and 280*a*. As the polarization direction of the light emitted from the polarized light source changes, the polarization directions according to the wavelengths at each of the birefringence zones 200*a* and 280*a* are different and they make a change.

As such, the light of which the polarization directions according to the wavelengths at each of the birefringence zones 200*a* and 280*a* makes a change is transmitted to the polarization zone 80, and the light of the wavelengths the polarization directions of which are vertical to the polarization direction of the polarization zone 80 cannot pass through the polarization zone 80 and the light of the other wavelengths can pass through wholly or partially according to their polarization directions. As a result, different colors appear on each of the birefringence zones 200a and 280a and they make a change, respectively, as the polarization direction of the light of the polarized light source 100 changes.

If the base member 40 is transparent or translucent, the same change is viewed from the behind of the base member 40.

It is possible to adjust the change of the colors on the birefringence zones 200a and 280a by adjusting the change of the polarization direction (for example, the range of the rotation or the rotation speed) of the light of the light of the polarized light source 100.

Figure 14:
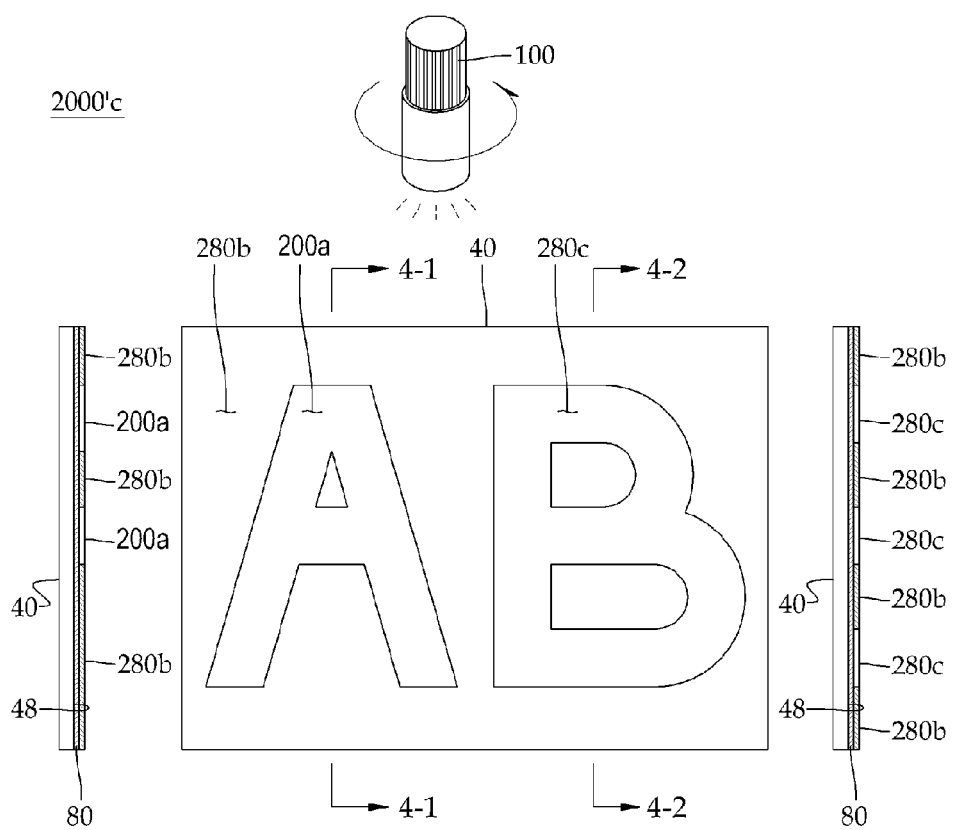
FIG. 14 shows a third embodiment of the display device having polarized light source according to the third aspect of the present invention.

FIG. 14 shows a third embodiment 2000'c of the display device having polarized light source according to the third aspect of the present invention.

According to the third embodiment 2000'c of the third aspect of the present invention, three birefringence zones 200a, 280b and 280c are provided and their birefringence characteristics are different.

That is, the first birefringence zone 200a having the shape of letter A and the third birefringence zone 280c having the shape of letter B are provided and the surrounding part of them forms the second birefringence zone 280b and the birefringence characteristics of the birefringence zones 200a, 280b and 280c are different from one another.

A polarization film is attached to the rear face of the birefringence zones 200a, 280b and 280c and forms a polarization zone 80.

The light emitted from the polarized light source 100 passes through the birefringence zones 200a, 280b and 280c and comes to have the different polarization directions according to the wavelengths different at each of the birefringence zones 200a, 280b and 280c.

The light having the different polarization directions according to the wavelengths different at each of the birefringence zones 200a, 280b and 280c is transmitted to the polarization zone 80 and the light of the wavelengths the polarization directions of which are vertical to the polarization direction of the polarization zone 80 cannot pass through the polarization zone 80 and the light of the other wavelengths can pass through wholly or partially according to their polarization directions. As a result, different colors appear on each of the birefringence zones 200a, 280b and 280c.

At this time, the polarization direction of the light of the polarized light source 100 changes so that the different colors appear on each of the birefringence zones 200a, 280b and 280c and they make a change, respectively.

If the base member 40 is transparent or translucent, the same change is viewed from the behind of the base member 40.

It is possible to adjust the change of the colors on the birefringence zones 200a, 280b and 280c by adjusting the change of the polarization direction (for example, the range of the rotation or the rotation speed) of the light of the polarized light source 100.

According to the present invention, the polarized light source 100 can be plural. If a plurality of the polarized light source s 100 is provided, there may need a control apparatus for synchronization that coincides the polarization directions of the lights from the polarized light source s at initial time and prevents any discordance of the polarization directions of the lights as the change continues. This synchronization is not essential and, in some cases, the synchronization is avoided to present an unique effect. Meanwhile, the polarized light source using the liquid crystal device 500 in FIG. 25 does not need the synchronization.

The polarization zone 80 includes a plurality of polarization zones the polarization directions of which are different. Accordingly, at the rear of the plural birefringence zones, the plural polarization zones are formed and display effect from their combination is obtained.

According to the present invention, if a plurality of the birefringence zones is provided, the birefringence characteristics thereof are different between the adjoining the birefringence zones and it is not necessary that the birefringence characteristics of all the birefringence zones are different.

For example, with reference to FIG. 14, among the three birefringence zones 200a, 280b and 280c, it is sufficient for the first birefringence zone 200a that the birefringence characteristics thereof is different from that of the adjoining second birefringence zone 280b and can be the same as that of the third birefringence zone 280c.

The display device having polarized light source according to the third aspect of the present invention presents various change of color on the birefringence zone and the birefringence zone solely or the birefringence zones together form a shape such as a picture, brand, or logo and it is possible to make colors appeared as they change thereon so that it may be used for a signboard (advertisement board) or interior design and be available for various filed such as advertisement or promotion and so forth.

The birefringence zone can be disposed on the exterior such as the glass window of the building and the present invention presents the change of colors according to the birefringence zones. This occasion is used for a kind of signboard or to increase the beauty of the building.

The light emitted from the polarized light source does not cause any visual disturbance like the first and the second aspects.

FIGS. 16 to 21 show a display device having polarized light source according to a fourth aspect of the present invention.

Figure 16:
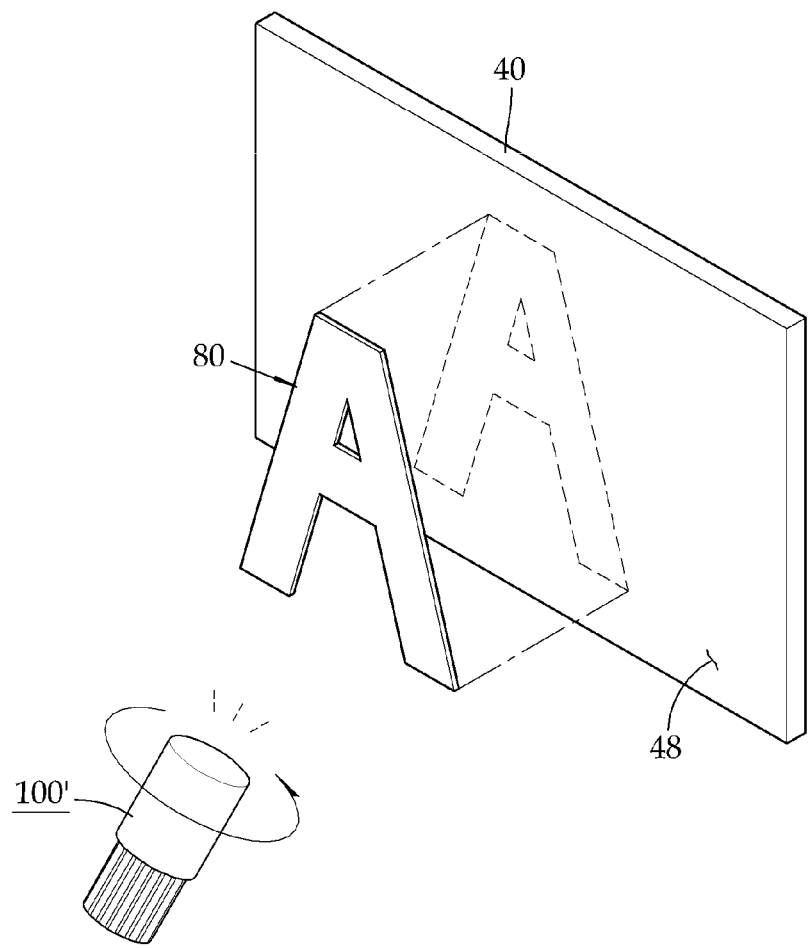
FIGS. 16 and 17 show a first embodiment of the display device having polarized light source according to a fourth aspect of the present invention.
Figure 17:
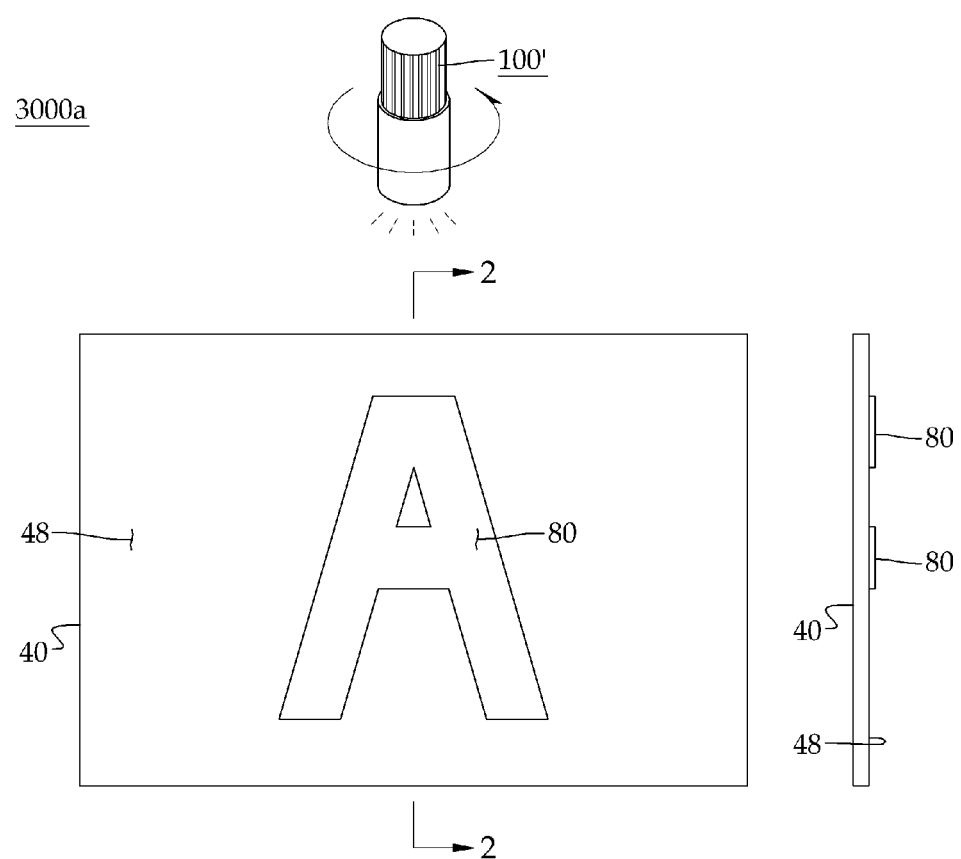

FIGS. 16 and 17 show a first embodiment 3000a of the display device having polarized light source according to the fourth aspect of the present invention.

A polarization zone 80 is provided and the polarization zone 80 comprises polarizing means for polarizing light.

The polarization zone 80 includes the polarizing means such as a polarization film, polarization plate or polarizing glass and it can polarize the light.

With respect to the drawing, the polarization film or polarizing glass having the shape of letter A is attached to the upper face 48 of the base member 40 and forms the polarization zone 80.

The polarization zone can be plural and if the plural polarization zones are provided, it is preferable that the polarization directions of the adjoining polarization zones are different.

According to the fourth aspect of the present invention, a polarized light source is provided. The polarized light source is to emit light of a particular color that is polarized and illuminated to the polarization zone 80.

Also, according to the fourth aspect of the present invention, the polarization direction of the light emitted from the polarized light source and the polarization direction of the polarization zone change relative to each other. As the example, in embodiments of the display device having polarized light source according to the fourth aspect of the present invention, a polarized light source 100' that emits polarized light of which the polarization direction changes is provided and the polarization zone is stationary.

The polarized light source 100' is to emit the light of a particular color that is polarized and its polarization direction changes and this polarized light source 100' can be provided by replacing the light source 8 in the polarized light source 100 according to the first aspect of the present invention with a light source emitting a particular color. For example, the light source 8 in the polarized light source 100 shown in FIGS. 22, 23 and 26 is replaced with the light source emitting light of a particular color.

As described, according to the fourth aspect of the present invention, the polarized light source 100' emitting the polarized light of a particular color of which the polarization direction changes shines the polarization zone 80.

As the light emitted from the polarized light source 100' is illuminated to the polarization zone 80, the particular color of the polarized light source 100' appears on the polarization zone 80 and when the polarization direction of the light changes and it comes to the point that it is vertical to the polarization direction of the polarization zone 80, the light cannot pass through the polarization zone 80.

Along the change of the polarization direction of the light emitted from the polarized light source 100', if the light passes through the polarization zone 80, the color of the polarized light source 100' appears on the polarization zone 80 and if the light cannot passes through the polarization zone 80, the polarization zone 80 becomes black or dark.

If the base member 40 has a color, the mixed color of the color of the light having passed therethrough and the color of the base member appears.

The above description is related to the viewing from the light source by the reflection of the light at the base member 40. If the base member 40 is transparent or translucent, some of the light passes through the base member 40 while some of the light is reflected at the base member 40 and the light having passed through the base member 40 presents the same change of color as the light reflected at the base member 40. Accordingly, the same change of the color is viewed if it is viewed from the behind of the base member 40.

Figure 18:
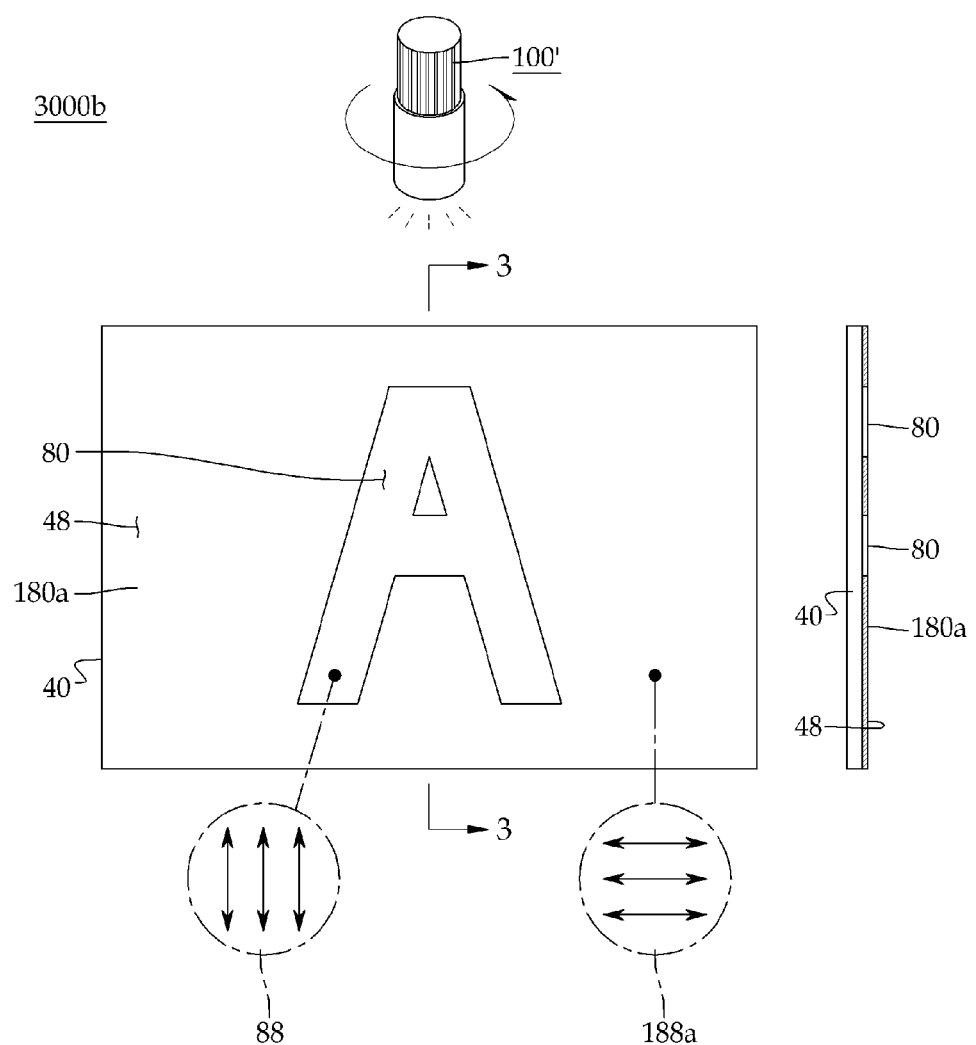
FIG. 18 shows a second embodiment of the display device having polarized light source according to the fourth aspect of the present invention.

FIG. 18 shows a second embodiment 3000b of the display device having polarized light source according to the fourth aspect of the present invention.

According to the second embodiment 3000b of the display device having polarized light source according to the fourth aspect of the present invention, two polarization zones 80 and 180a are provided and the polarization directions of the polarization zones 80 and 180a are vertical to each other.

That is, with respect to the first polarization zone 80, the surrounding part forms the second polarization zone 180a and the polarization directions 80 and 88 of the first and second polarization zones 80 and 180 are vertical to each other.

For example, a polarization film having the shape of letter A is attached to the base member 40 to form the first polarization zone 80. Then a polarization film is attached to the base member 40 to surround the first polarization zone 80 and have its polarization direction 188a vertical to the polarization direction 88 of the first polarization zone 80 so as to form the second polarization zone 180a.

As the polarization direction of the light of the particular color emitted from the polarized light source 100' changes, the light of the particular color cannot pass through the first polarization zone 80 if the polarization direction of the light comes to be vertical to the polarization direction of the first polarization zone 80 and then the light of the particular color cannot pass through the second polarization zone 180a if the polarization direction of the light comes to be vertical to the polarization direction of the second polarization zone 180a.

In this case, since the polarization directions of the first polarization zone 80 and the second polarization zone 180a are vertical to each other, the polarization direction of the light from the polarized light source 100' is horizontal to the polarization direction of the second polarization zone 180a if it is vertical to the polarization direction of the first polarization zone 80 and, reversely, it is horizontal to the polarization direction of the first polarization zone 80 if it is vertical to the polarization direction of the second polarization zone 180a.

Accordingly, on the two polarization zones 80 and 180a of the display device having polarized light source 3000b, one becomes colored by the color of the light source while the other becomes dark or black as the light is blocked to pass through.

It is possible to adjust the change of color presented on the polarization zones 80 and 180a by adjusting the change of the polarization direction (for example, the range of rotation or rotation speed) of the light emitted from the polarized light source 100'.

Figure 19:
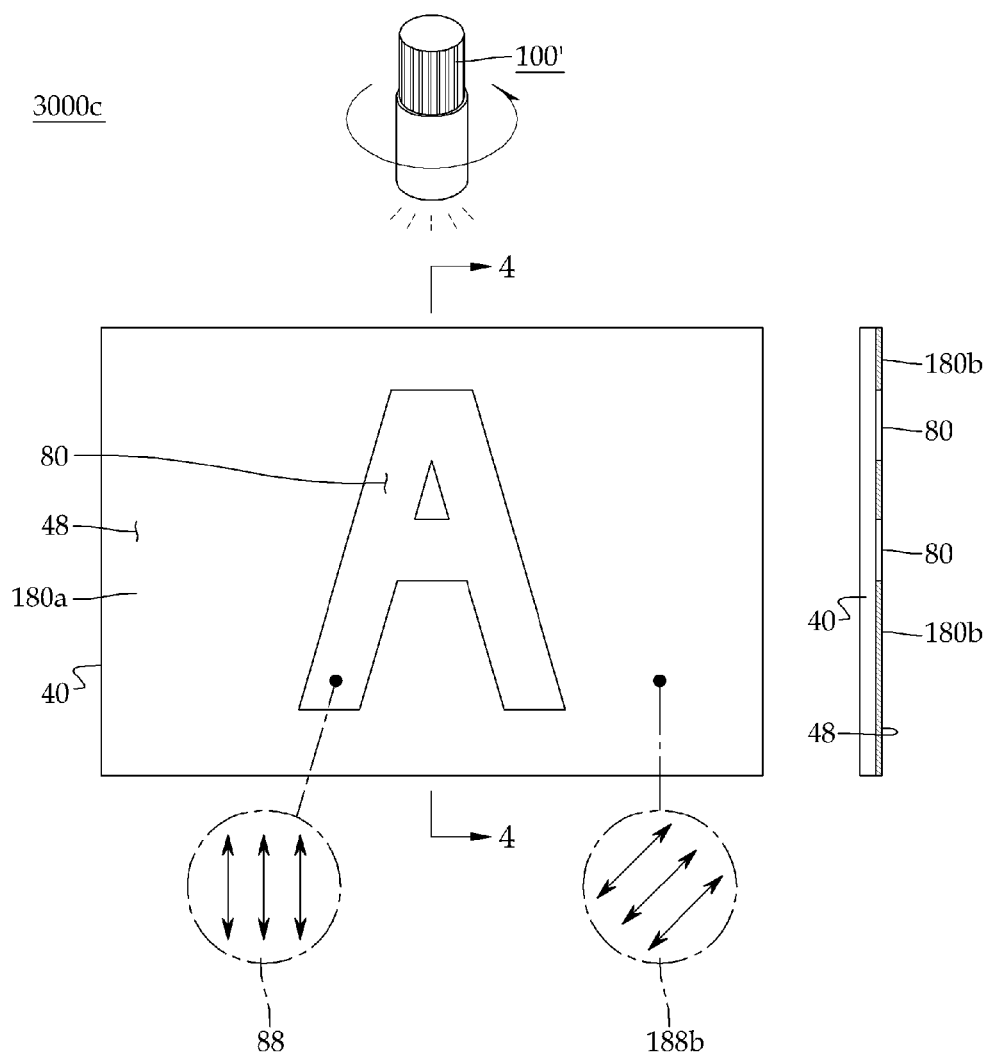
FIG. 19 shows a third embodiment of the display device having polarized light source according to the fourth aspect of the present invention.

FIG. 19 shows a third embodiment 3000c of the display device having polarized light source according to the fourth aspect of the present invention.

In the third embodiment 3000c of the display device having polarized light source according to the fourth aspect of the present invention, two polarization zones 80 and 180b are provided and the polarization directions of the polarization zones 80 and 180b are 45° off each other.

With respect to the first polarization zone 80 having the shape of letter A, the surrounding part forms the second polarization zone 180b and the polarization direction 88 of the first polarization zone 80 and the polarization direction 188b of the second polarization zone 180b are 45° off each other.

For example, a polarization film having the shape of letter A is attached to the surface 48 of the base member 40 to form the first polarization zone 80. Then, a polarization film is attached to surround the first polarization zone 80 and have its polarization direction 188b 45° off the polarization direction of the first polarization zone 80 and the second polarization zone 180b is formed.

As the polarization direction of the light of the particular color from the polarized light source 100' changes, the light of the particular color cannot pass through the first polarization zone 80 if the polarization direction of the light comes to be vertical to the polarization direction of the first polarization zone 80 and then the light cannot pass through the second polarization zone 180b if the polarization direction of the light comes to be vertical to the polarization direction of the second polarization zone 180b. Accordingly, on the two polarization zones 80 and 180b, both of them are presented with the color of the light source and then, one of them becomes black or dark.

It is possible to adjust the change of color presented between the polarization zones 80 and 180b by adjusting the change of the polarization direction (for example, the range of rotation or rotation speed) of the light emitted from the polarized light source 100'.

Figure 20:
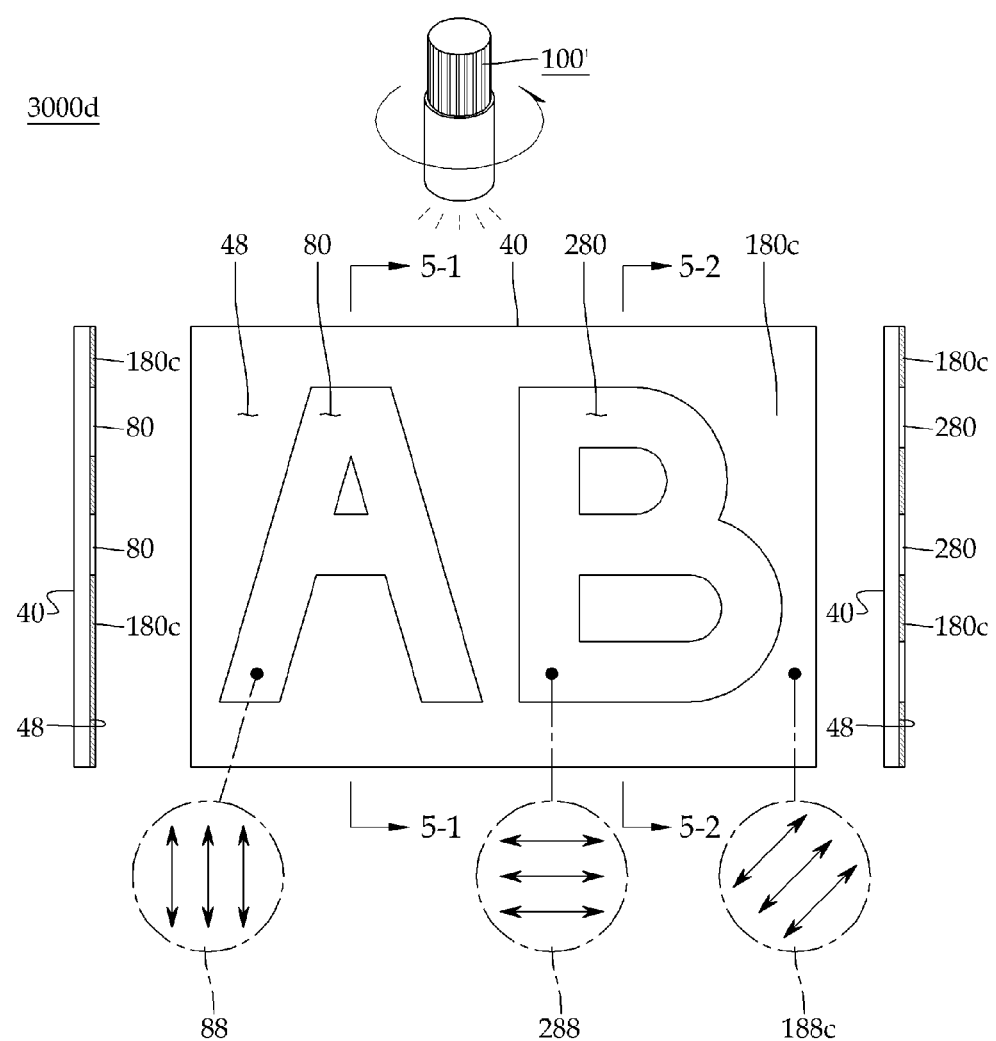
FIG. 20 shows a fourth embodiment of the display device having polarized light source according to the fourth aspect of the present invention.

FIG. 20 shows a fourth embodiment 3000d of the display device having polarized light source of the fourth aspect of the present invention.

In the fourth embodiment 3000*d* of the display device having polarized light source of the fourth aspect of the present invention, three polarization zones 80, 180*c* and 280 are provided and the polarization directions of the polarization zones 80, 180*c* and 280 are 45° off one another along their sequence of the arrangement. That is, if the polarization direction 88 of the first polarization zone 80 is 90°, the polarization direction 188*c* of the second polarization zone 180*c* is 45° and the polarization direction 288 of the third polarization zone 280 is 0°.

The first polarization zone 80 having the shape of letter A and the third polarization zone 280 having the shape of letter B are provided and the surrounding part of them forms the second polarization zone 180*c*, and the polarization directions 88, 188*c* and 288 of the polarization zones 80, 180*c* and 280 are sequentially 45° off one another along the arrangement.

For example, the first polarization zone 80 is formed by attaching a polarization film having the shape of letter A. The third polarization zone 280 is formed by attaching a polarization film having the shape of letter B to be arranged that the polarization direction 288 thereof is 90° off the polarization direction 88 of the first polarization zone 80. Then, the second polarization zone 180*c* is formed by attaching a polarization film to surround the first polarization zone 80 and the third polarization zone 280 and to be arranged that the polarization direction 188*c* thereof is 45° off the polarization direction 88 of the first polarization zone 80 and the polarization direction 288 of the third polarization zone 280, respectively.

In this case, as the polarization direction of the light of the particular light emitted from the polarized light source 100' changes, the light cannot pass through the first polarization zone 80 if the polarization direction of the light comes to be vertical to the polarization direction of the first polarization zone 80, the light cannot pass through the second polarization zone 180*c* if the polarization direction of the light comes to be vertical to the polarization direction of the second polarization zone 180*c*, and then, the light cannot pass through the third polarization zone 280 if the polarization direction of the light comes to be vertical to the polarization direction of the third polarization zone 280.

Accordingly, the three polarization zones 80, 180*c* and 280 become sequentially dark or black and other zones become to present the color of the polarized light source 100'.

According to the fourth aspect of the present invention, the polarized light source 100' may be plural.

Figure 21:
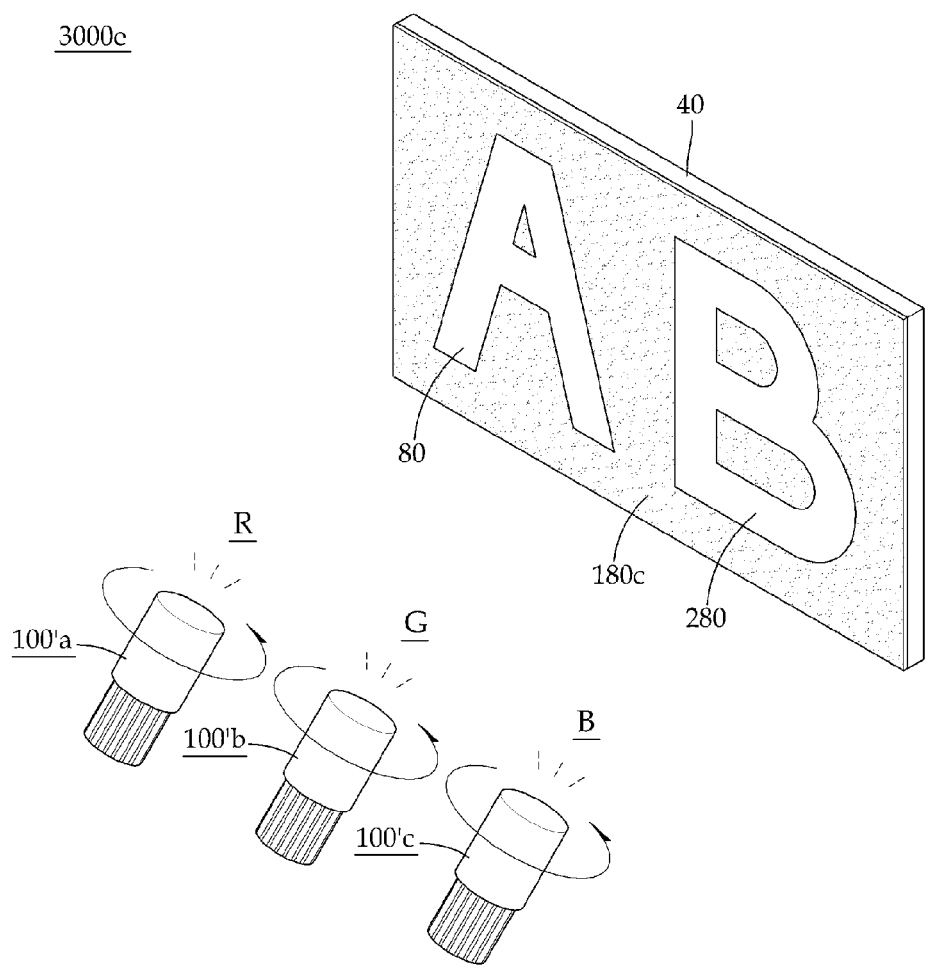
FIG. 21 shows a fifth embodiment of the display device having polarized light source according to the fourth aspect of the present invention.

FIG. 21 shows a fifth embodiment 3000*e* of the display device having polarized light source according to the fourth aspect of the present invention.

In this case, three polarized light sources 100'*a*, 100'*b* and 100'*c* emitting color of R (red), G (green) and B (blue), respectively are provided for the polarized light source emitting the polarized light of the particular color of which the polarization direction changes. Accordingly, it is possible to present various colors and their changes.

That is, one of the polarized light source operates while the others are turned off, the color of the operating polarized light source is illuminated to the polarization zones 80, 180*c* and 280 and the effect is the same as that of the case described with respect to FIG. 21.

If one of the polarized light source is turned off and the two others operates, the colors of the light sources are mixed and the mixed color is presented on the polarization zones 80, 180*c* and 280.

If all of three polarized light sources operate, the colors of the three polarized light sources are mixed and the mixed color is presented on the polarization zones 80, 180*c* and 280.

R, G and B are basic colors and it is possible to determine a color on the polarization zone by determining their mixing ratio. Therefore, according to the present invention, it is possible to present not only various colors on the polarization zones but also the change of the colors on each of the polarization zones as the polarization direction of the polarized light sources 100'*a*, 100'*b* and 100'*c* of R, G and B make a change.

Meanwhile, if the three polarized light sources 100'*a*, 100'*b* and 100'*c* of R, G and B are closely disposed to one another and their illumination scopes are coincided, the lights are mixed to be the white light and no visual disturbance happens.

The mixing ratio can be determined by the adjustment of the change of the polarization direction of the light of the respective polarized light source 100'*a*, 100'*b* or 100'*c*, by the adjustment of the amount of the light of the respective polarized light source or by adjustment of the illumination position of the respective polarized light source (for example, the lights of the three respective polarized light sources are focused or dispersed).

Figure 28:
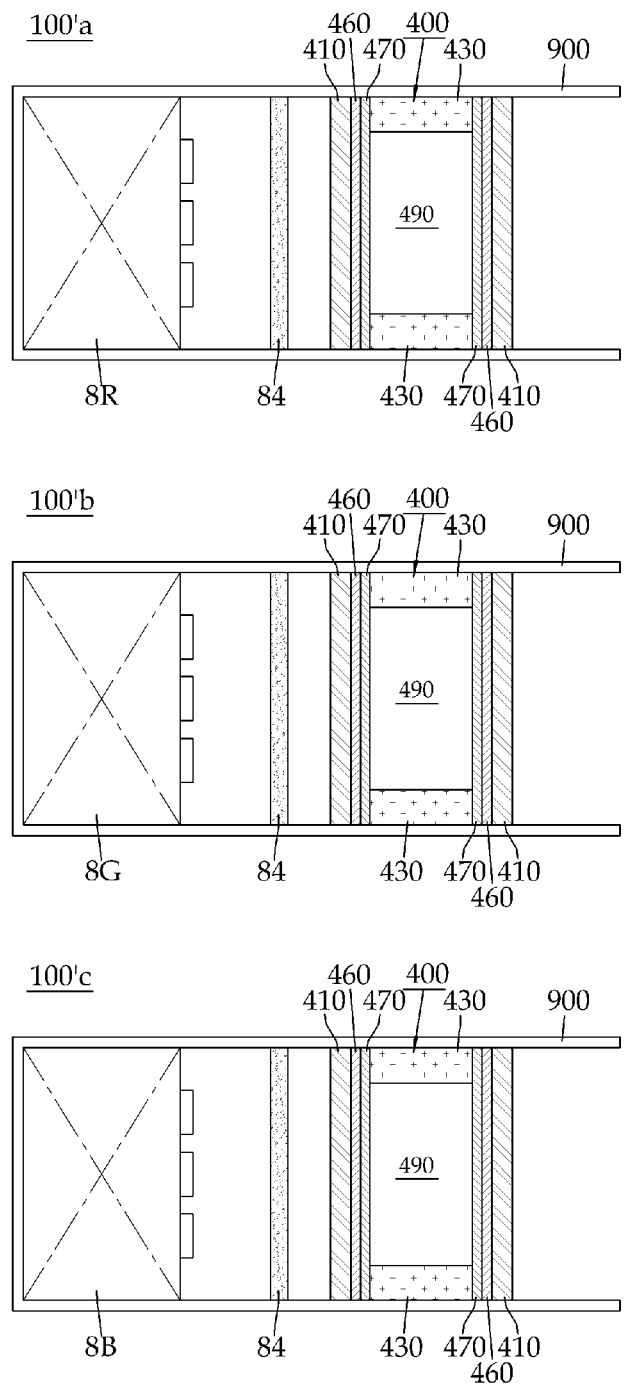
FIG. 28 shows structures of the polarized light sources of R, G and B by means of the liquid crystal device.

FIG. 28 shows structures of the polarized light source 100'*a*, 100'*b* or 100'*c* of R, G and B by means of the liquid crystal device 400 in FIG. 25.

The red polarized light source 100'*a* has a light source 8R emitting light of red color and light polarizing means 84 such as the polarization film or polarizing filter is arranged in front of the light source 8R and the liquid crystal device 400 is arranged in front of the light polarizing means 84.

The green polarized light source 100'*b* has a light source 8G emitting light of green color and light polarizing means 84 such as the polarization film or polarizing filter is arranged in front of the light source 8G and the liquid crystal device 400 is arranged in front of the light polarizing means 84.

Also, the blue polarized light source 100'*c* has a light source 8B emitting light of blue color and light polarizing means 84 such as the polarization film or polarizing filter is arranged in front of the light source 8B and the liquid crystal device 400 is arranged in front of the light polarizing means 84.

The polarized light sources 100'*a*, 100'*b* and 100'*c* emit the red, green or blue colored light from the light sources 8R, 8G, 8B, respectively, and the colored lights are polarized as it passes through the light polarizing means 84 and their polarization directions change in proportional to the voltage applied to the liquid crystal device 400.

The display device having polarized light source according to the fourth aspect of the present invention provides the polarized light source emitting the polarized light of the particular color and presents the change of color on the polarization zone thereby. Like other aspects of the present invention, the polarization zone solely or the polarization zones together form a shape such as a picture, brand, or logo and it is possible to make colors appeared as they change thereon so that it may be used for a signboard (advertisement board) or interior design and be available for various filed such as advertisement or promotion and so forth.

The polarization zone is disposed on the exterior such as the glass window of the building and the present invention presents the change of colors according to the polarization zones. This case is used for a kind of signboard or to increase the beauty of the building.

Further, according to the fourth aspect of the present invention, the polarized light sources of basic colors of R, G and B are provided and their colors are mixed to present various colors and their changes on the polarization zones. If the colors of R, G and B emitted from the polarized light sources are mixed to produce the white light, there is no visual disturbance.

The present invention is explained along the embodiments, however not limited thereto and the scope of the invention is determined by the following claims.

What is claimed is:

1. A display device comprising:
   (a) a light source;
   (b) first light polarizing means for polarizing light from the light source;
   (c) means for rotating the first light polarizing means;
   (d) a reflecting base member having on one surface second light polarizing means for forming a polarization images to be displayed; and
   (e) a birefringent medium positioned between the first light polarizing means and the second light polarizing means wherein the polarized light emitted from the light source through the first polarizing means passes through the birefringence medium to the second light polarizing means, and is reflected back by the base member.

2. A display device comprising:
   (a) a polarized light source including a light source emitting white light, first light polarizing means for polarizing the white light emitted from the light source, and means for rotating the first light polarizing means;
   (b) a light reflecting base member;
   (c) a second light polarizing means disposed on the surface of the base member; and
   (d) a birefringence medium positioned between the polarized light source and the second light polarizing means wherein the polarized white light emitted from the polarized light source passes through the birefringence medium to the second light polarizing means, and is reflected back by the base member.

3. The display device according to claim 2 wherein the birefringence medium is a film or a plate and disposed on the first light polarizing means.

4. The display device according to claim 2 wherein the second light polarizing means includes at least two light polarizing means.

5. The display device according to claim 4 wherein the at least two second light polarizing means adjoin one another, and the polarization directions of the adjoining light polarizing means are different.

6. The display device according to claim 5 wherein the polarization directions of adjoining light polarizing means are angularly sequential from one light polarizing means to the next.

7. A display device having polarized light source comprising:
   (a) a base member;
   (b) a first light polarizing means disposed on the surface of the base member, the first light polarizing means forming a polarization zone to be displayed; and
   (c) a polarized light source emitting polarized light towards the first light polarizing means, the polarized light source including a light source, a second light polarizing means for polarizing the light emitted from the light source, a liquid crystal device to which the polarized light from the light source through the second light polarizing means is transmitted whereby the polarization direction of the polarized light that travels through the liquid crystal device changes according to voltage applied to the liquid crystal device.

8. A display device having polarized light source comprising:
   (a) a base member;
   (b) a first light polarizing means disposed on the surface of the base member, the first light polarizing means forming a polarization zone to be displayed;
   (c) a polarized light source emitting polarized light towards the first light polarizing means, the polarized light source including a light source, a second light polarizing means for polarizing the light emitted from the light source, a liquid crystal device to which the polarized light from the light source through the second light polarizing means is transmitted whereby the polarization direction of the polarized light that travels through the liquid crystal device changes according to voltage applied to the liquid crystal device; and
   (d) a birefringence medium positioned between the polarized light source and the first light polarizing means wherein the polarized light emitted from the polarized light source passes through the birefringence medium to the first light polarizing means and is reflected back by the base member.

* * * * *